(12) United States Patent
Driscoll et al.

(10) Patent No.: US 7,853,517 B2
(45) Date of Patent: Dec. 14, 2010

(54) LOCKING PREFERENCES AND TEST TRADING

(75) Inventors: James R. Driscoll, New York, NY (US); Matthew W. Claus, Summit, NJ (US)

(73) Assignee: BGC Partners, Inc., Wilmington, DE (US)

( * ) Notice: Subject to any disclaimer, the term of this patent is extended or adjusted under 35 U.S.C. 154(b) by 0 days.

(21) Appl. No.: 12/686,365

(22) Filed: Jan. 12, 2010

(65) Prior Publication Data

US 2010/0179901 A1 Jul. 15, 2010

Related U.S. Application Data

(63) Continuation of application No. 11/695,242, filed on Apr. 2, 2007, now Pat. No. 7,711,633.

(51) Int. Cl.
*G06Q 40/00* (2006.01)
(52) U.S. Cl. .................. 705/37; 705/35; 705/36 R; 705/38
(58) Field of Classification Search ............. 705/37
See application file for complete search history.

(56) References Cited

U.S. PATENT DOCUMENTS

| | | | |
|---|---|---|---|
| 3,581,077 A | 5/1971 | Damewood et al. |
| 4,412,287 A | 10/1983 | Braddock, III |
| 4,588,192 A | 5/1986 | Laborde |
| 4,674,044 A | 6/1987 | Kalmus et al. |
| 4,840,382 A | 6/1989 | Rubin |
| 5,077,665 A | 12/1991 | Silverman et al. |
| 5,083,800 A | 1/1992 | Lockton |
| 5,102,143 A | 4/1992 | Winkelman |
| 5,136,501 A | 8/1992 | Silverman et al. |
| 5,150,907 A | 9/1992 | Desmarais et al. |
| 5,270,922 A | 12/1993 | Higgins |
| 5,297,032 A | 3/1994 | Trojan et al. |
| 5,305,200 A | 4/1994 | Hartheimer et al. |
| 5,655,088 A | 8/1997 | Midorikawa et al. |
| 5,689,651 A | 11/1997 | Lozman |
| 5,713,793 A | 2/1998 | Holte |
| 5,727,165 A | 3/1998 | Ordish et al. |
| 5,774,880 A | 6/1998 | Ginsberg |
| 5,779,549 A | 7/1998 | Walker et al. |
| 5,809,483 A | 9/1998 | Broka et al. |
| 5,857,176 A | 1/1999 | Ginsberg |
| 5,915,209 A | 6/1999 | Lawrence |
| 5,934,674 A | 8/1999 | Bukowsky |
| 5,950,176 A | 9/1999 | Keiser et al. |
| 6,029,146 A | 2/2000 | Hawkins et al. |
| 6,322,076 B1 | 11/2001 | Fikki |
| 6,408,263 B1 | 6/2002 | Summers |
| 6,421,653 B1 | 7/2002 | May |
| H2064 H | 5/2003 | Buchalter |

(Continued)

OTHER PUBLICATIONS

"Thunderhead: Thunderhead announces its XML adapter for DTCC Deriv/SERV trade matching: the key to real time OTC derivatives trade matchin," Jun. 30, 2005, M2 Presswire.*

(Continued)

*Primary Examiner*—Charles R Kyle
*Assistant Examiner*—Seth Weis

(57) ABSTRACT

In various embodiments, test trading orders are generated, transmitted and ranked.

100 Claims, 6 Drawing Sheets

I - Individual Trader
A - Agent
C - Clearing House

U.S. PATENT DOCUMENTS

| | | | |
|---|---|---|---|
| 6,634,950 | B2 | 10/2003 | Yoshimi et al. |
| 6,709,330 | B1 | 3/2004 | Klein et al. |
| 6,939,137 | B1 | 9/2005 | Colaio et al. |
| 7,127,422 | B1 | 10/2006 | Bundy |
| 7,130,824 | B1 | 10/2006 | Amanat et al. |
| 7,177,833 | B1 | 2/2007 | Marynowski |
| 7,242,669 | B2 | 7/2007 | Bundy et al. |
| 7,330,834 | B1 | 2/2008 | LaPierre |
| 7,341,455 | B2 | 3/2008 | Colaio et al. |
| 7,428,506 | B2 | 9/2008 | Waelbroeck et al. |
| 7,454,382 | B1 | 11/2008 | Triplett |
| 2001/0039530 | A1 | 11/2001 | Annunziata |
| 2001/0049651 | A1 | 12/2001 | Selleck |
| 2001/0056398 | A1 | 12/2001 | Scheirer |
| 2002/0002531 | A1 | 1/2002 | Lustig et al. |
| 2002/0023048 | A1 | 2/2002 | Buhannic et al. |
| 2002/0083213 | A1 | 6/2002 | Oberstein et al. |
| 2002/0091617 | A1 | 7/2002 | Keith |
| 2002/0138401 | A1 | 9/2002 | Allen et al. |
| 2002/0156716 | A1 | 10/2002 | Adatia et al. |
| 2002/0198816 | A1 | 12/2002 | Gilbert et al. |
| 2003/0126068 | A1 | 7/2003 | Hauk et al. |
| 2004/0064395 | A1* | 4/2004 | Mintz et al. .................. 705/37 |
| 2005/0075963 | A1 | 4/2005 | Balabon |
| 2005/0137961 | A1 | 6/2005 | Brann et al. |
| 2005/0228741 | A1 | 10/2005 | Leibowitz |
| 2005/0246263 | A1 | 11/2005 | Ogg et al. |
| 2006/0106707 | A1 | 5/2006 | Shetty et al. |
| 2006/0173764 | A1 | 8/2006 | Costakis et al. |
| 2006/0259399 | A1 | 11/2006 | Mintz et al. |
| 2006/0265319 | A1 | 11/2006 | Friesen et al. |
| 2007/0027796 | A1 | 2/2007 | Claus et al. |
| 2007/0027797 | A1 | 2/2007 | Claus et al. |
| 2007/0043650 | A1 | 2/2007 | Hughes et al. |
| 2007/0043653 | A1 | 2/2007 | Hughes et al. |
| 2007/0083452 | A1 | 4/2007 | Mayle et al. |
| 2008/0172318 | A1 | 7/2008 | Bartko et al. |
| 2008/0172319 | A1 | 7/2008 | Bartko et al. |
| 2008/0172321 | A1* | 7/2008 | Bartko et al. .................. 705/37 |
| 2008/0313095 | A1 | 12/2008 | Shalen |
| 2009/0132335 | A1 | 5/2009 | Pein et al. |

OTHER PUBLICATIONS

Mosser, Mike and Codding, Jamey, "Gentlemen, start your exchanges," Jun. 2000, Futures v29n6, pp. 76-80.*

"Aegis software upgrades exchange simulator for NASDAQ and London Stock Exchange," May 30, 2006, Businnes Wire.*

PCT Search report and Written Opinion for International Application No. PCT/US08/58983; 15 pages; Sep. 10, 2008.

*PCT Invitation to pay Additional Fees, and where Applicable, Protest Fees* for International Application #PCT/US08/58983, 2 pages, Jun. 18, 2008.

U.S. Appl. No. 11/695,242 entitled *Systems and Methods for Processing and Transmitting Test Orders* by James Driscoll, et. al., filed on Apr. 2, 2007.

U.S. Appl. No. 11/695,277 entitled *Methods and Systems for Placing, Transmitting and Ranking Trading Orders* by James Driscoll, et. al., filed on Apr. 2, 2007.

U.S. Appl. No. 11/695,257 entitled *Products and Processes for Differentiating Trading Orders* by James Driscoll, et. al., filed on Apr. 2, 2007.

U.S. PTO Office Action for U.S. Appl. No. 11/695,230; 10 pages; Dec. 30, 2008.

U.S. Appl. No. 11/695,230 entitled Test Trading by James Driscoll, et. al., filed on Apr. 2, 2007.

U.S. PTO Office Action for U.S. Appl. No. 11/695,242; 6 pages; Oct. 7, 2008.

U.S. PTO Office Action for U.S. Appl. No. 11/695,277; 6 pages; Nov. 21, 2008.

U.S. PTO Office Action for U.S. Appl. No. 11/695,257; 6 pages; Nov. 21, 2008.

U.S. PTO Office Action for U.S. Appl. No. 11/695,277; 9 pages; Apr. 6, 2009.

U.S. PTO Office Action for U.S. Appl. No. 11/695,257; 11 pages; Apr. 3, 2009.

U.S. PTO Office Action for U.S. Appl. No. 11/695,242; 14 pages; Jul. 7, 2009.

U.S. Appl. No. 12/564,377 filed Sep. 22, 2009.

Notice of Allowance for U.S. Appl. No. 11/695,230, Oct. 30, 2009; 4 pages.

Supplemental Notice of Allowance for U.S. Appl. No. 11/695,230, Nov. 16, 2009; 4 pages.

Notice of Allowance for U.S. Appl. No. 11/695,257, Dec. 8, 2009; 48 pages.

Notice of Allowance for U.S. Appl. No. 11/695,242; Dec. 15, 2009; 9 pages.

Notice of Allowance for U.S. Appl. No. 11/695,277; Jan. 12, 2010; 97 pages.

Mathew Schwartz, Test Case, Aug. 2000, Computerworld, p. 62.

Notice of Allowance for U.S. Appl. No. 12/564,377; Apr. 5, 2010; 12 pages.

"Aegis Software Develops Allocations Specification for Futures and Foreign Exchanges," Oct. 23, 2006, Business Wire, p NA.

U.S. Appl. No. 12/780,361 filed May 14, 2010; 43 pages.

U.S. Appl. No. 12/564,377 filed Sep. 22, 2009; 43 pages.

U.S. Appl. No. 12/780,403 filed May 14; 43 pages.

U.S. Appl. No. 12/686,358 filed Jan. 12, 2010; 46 pages.

U.S. Appl. No. 12/686,362 filed Jan. 12, 2010; 46 pages.

U.S. Appl. No. 12/686,368 filed Jan. 12, 2010; 43 pages.

U.S. Appl. No. 11/972,075 filed Jan. 10, 2008; 20 pages.

Notice of Allowance for U.S. Appl. No. 10/015,739; 3 pages; May 17, 2005.

Notice of Allowance for U.S. Appl. No. 10/015,739; 7 pages; Jan. 14, 2005.

US PTO Office Action for U.S. Appl. No. 10/015,739; May 27, 2004; 10 pages.

Notice of Allowance for U.S. Appl. No. 11/097,454; 6 pages; Oct. 10, 2007.

US PTO Office Action for U.S. Appl. No. 11/097,454; May 7, 2007; 8 pages.

US PTO Office Action for U.S. Appl. No. 11/097,454; May 16, 2006; 8 pages.

US PTO Office Action for U.S. Appl. No. 11/097,454; Nov. 22, 2005; 9 pages.

US PTO Office Action for U.S. Appl. No. 11/097,454; Aug. 30, 2005; 7 pages.

Prebrief Appeal Conference Decision for U.S. Appl. No. 11/972,075; 2 pages; Jul. 27, 2010.

US PTO Office Action for U.S. Appl. No. 11/972,075; Jan. 13, 2010; 24 pages.

US PTO Office Action for U.S. Appl. No. 11/972,075; Feb. 2, 2009; 17 pages.

Isaac, M. et al., Price Controls and the Behavior of Auction markets: An Experimental Examination; American Economic Review, vol. 71, pp. 448-459 (Jun. 1981).

Forsythe, R et al., "Asset Valuation in an Experimental Market," Econometrica, vol. 50, pp. 537-567 (May 1982).

Plott, C. et. al. "Efficiency of Experimental Security Markets with Insider Information: An Application of Rational Expectations Models," Journal of Political Economy, vol. 90, pp. 663-698 (Aug. 1982).

Plott, C. et al., "Externalities and Corrective Policies in Experimental Markets," Economic Journal, vol. 93, pp. 106-127 (Mar. 1983).

Plott, C. et al. "Rational Choice in Experimental markets." Journal of Business, vol. 59, pp. S301-S327 (Oct. 1986).

Landis, K., "Multi-Talented System Opens Windows for Traders World," Wall Street Computer Review, pp. 86-93 (Apr. 1988).

Matthew, J., "OTC Success Spurs Specialized Trading Systems," Wall Street Computer Review, pp. 28-38 (Sep. 1989).

Leinweber, D., "Knowledge-Based Systems for Financial Applications," IEEE Expert, vol. 3, pp. 18-20 (Fall 1998).

Noth, M. et al. "Information Aggregation in Experimental Asset markets: Traps and Misaligned Beliefs," Social Science Working Paper No. 1060. Pasadena: California Institute of technology (Apr. 1999).

Bossaerts, P. et al., "Basic Principles of Asset Pricing Theory: Evidence from Large-Scale Experimental Financial Markets," Social Science Working Paper No. 1070. Pasadena: California Institute of Technology (Feb. 2000).

Charles Darrow, Monopoly, Parker Brothers Real Estate Trading Game, 1934.

Investopedia: Tutorials and Lessons, at http://www/investopedia.com/university (printed Feb. 21, 2006).

Using Reuters 3000 Xtra System for financial information education; Lewis G. Liu, Richard Holowczak; Online Information Review. Bradford: 2000, vol. 24, Issue 5; pp. 1-6.

AU Examiners Report dated Jul. 16, 2010 for AU Application No. 2008232500; 2 pages.

Mearian, Lucas, trades at Top Speed, Mar. 3, 2003, Computerworld, v37n9, pp. 21-24.

Neovest Launches Intelligent, Automated order Entry, Jun. 11, 2001, Business Wire, p. 2080.

Build Online Trading Skills with Lind Simulated Trading, Jun. 15, 2003, Futures, v32n8, p. 36.

Notice of Allowance for U.S. Appl. No. 12/686,358; 33 pages; Oct. 5, 2010.

Notice of Allowance for U.S. Appl. No. 12/686,362; 34 pages; Oct. 5, 2010.

* cited by examiner

Header = (Length, Flags, Applcation Data)
Length = 16 bit binary, length of header & message
        Left to Right ordering, 2 bytes
Flags = 16 bit binary, 0=real order,
        1=test order, 2 bytes
Application data = variable length,
                even number of bytes 和pro rata相关内容...

LOCKING PREFERENCES AND TEST TRADING

CROSS-REFERENCE TO RELATED APPLICATION

The present application is a continuation of U.S. patent application Ser. No. 11/695,242, which was filed Apr. 2, 2007, now U.S. Pat. No. 7,711,633 and which is hereby incorporated by reference herein in its entirety.

BACKGROUND

A securities exchange includes a computer system for trading securities. Instrument is synonymous with a security. A computer system includes one or more computers. A trading computer system includes structure and code for receiving orders, storing orders in an order book, matching bids and offers in the order book, executing orders in the order book, and reporting on status of orders and executions.

An order means an instruction placed with a securities exchange to buy or sell a quantity of securities under certain conditions. An order specifies that it is either a bid or an offer, and specifies a price, a quantity, and an identify of the market participant entity placing the order.

A bid is an order to buy. An offer is an order to sell.

An order book means a list of orders, including bid orders and offer orders.

Matching means associating a bid having a price that equals or exceeds an offer price, with the offer.

Executing an order means updating the order book to indicate changes to the order as a result of a matching involving the order.

Transaction means a legally binding contract that binds the parties whose matching bid and offer were executed to tender the securities or money specified in their respective orders.

Done, with respect to an order, means the order was fully executed such that no quantity remains in the order book associated with that order.

Settlement means payment in exchange for legal title. Settlement requires the parties who had placed bids and offers that were involved in a transaction to tender the security or money specified by their orders.

Typically, there is an order book for each security being traded. Computerized trading systems report on status of an order to the entity originating the order.

In exchanges that use clearinghouses, the trading computer system also reports each executed order to a clearinghouse. A clearinghouse receives actual securities, reassigns ownership corresponding to the executed order, and accepts the risk of non settlement for executed orders.

Certain exchanges do not use clearinghouses, and in these exchanges, the trading entities participating in the exchange accept the risk of non settlement for executed orders.

Parties accepting the risk of non settlement usually have risk limiting policies implemented in risk limiting algorithms. These algorithms are intended to prevent that party from accepting or executing orders that would extend to another entity credit exceeding the amount defined by that party's risk limit policy. A trading computer system may include a risk limiting algorithm. Variables typically used in risk limiting algorithms include identify of the legal entity involved in the transaction, and quantities and values for that entities orders.

Each trading computer system implements trades using its own protocol for matching bids to offers. However, the two main matching protocols are (1) price and time and (2) price and pro rata. In trading systems implementing a price and time protocol, for orders specifying the same price, orders placed earlier in time take priority over orders placed later in time such that the orders placed earlier in time execute prior to the orders placed later in time. In trading systems implementing a price and pro rata protocol, orders having the same price are partially executed at a pro rata amount against quantity of a matching order.

There exist variations on the foregoing, such as protocols implementing last buyer and/or last seller rights. These are rights accorded to the last buyer or last seller of an instrument to be the next in line buyer or the next seller of the same instrument for a period of time, typically on the order of seconds.

Trading computer systems may be either anonymous, or not anonymous. Anonymous means that the system provides to traders a version of the order book that does not include identify of the legal entities placing the orders.

A securities exchange typically charges a fee for placing orders in its trading computer system. Information relating to the fee may be associated with each order in each order book. Typically, there is one order book per security. A clearinghouse typically charges a fee for assuming the risk of non settlement. Information regarding a clearinghouse fee may be included in the report of executed transactions transmitted from the trading computer system to the originators of the orders, and to the clearinghouse. Information transmitted to a clearinghouse in association with an execution includes the identity of the legal entities involved in the executed transaction.

A conventional order as described above is referred to herein below as a real order.

Traders run a variety of tools to test trading strategies. The goal of such tools is to determine trading strategies that will result in maximal profit to the trader.

BRIEF DESCRIPTIONS OF THE DRAWINGS

The figures show elements of embodiments of the inventions. The same reference number in different figures refers to identical elements or elements with similar structure or function.

Figure 8A:
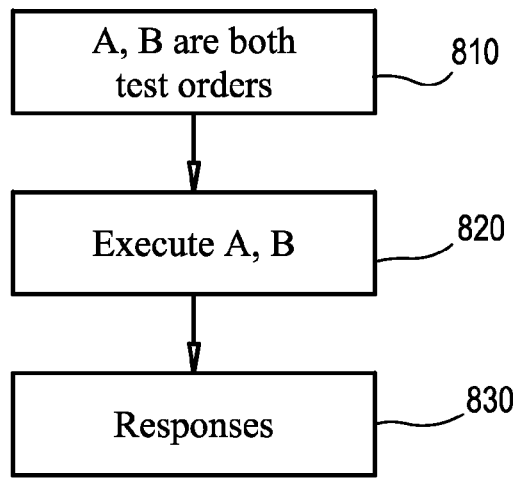
Figure 8B:
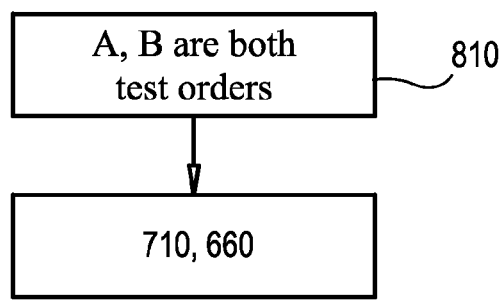
Figure 8C:
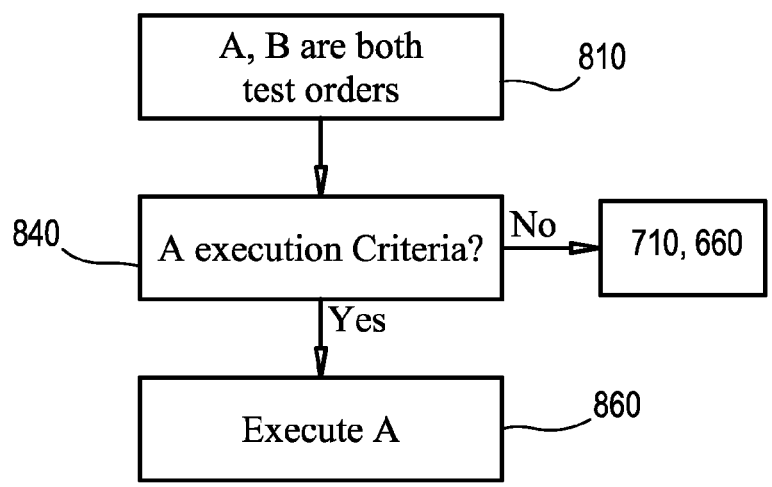
Figure 9:
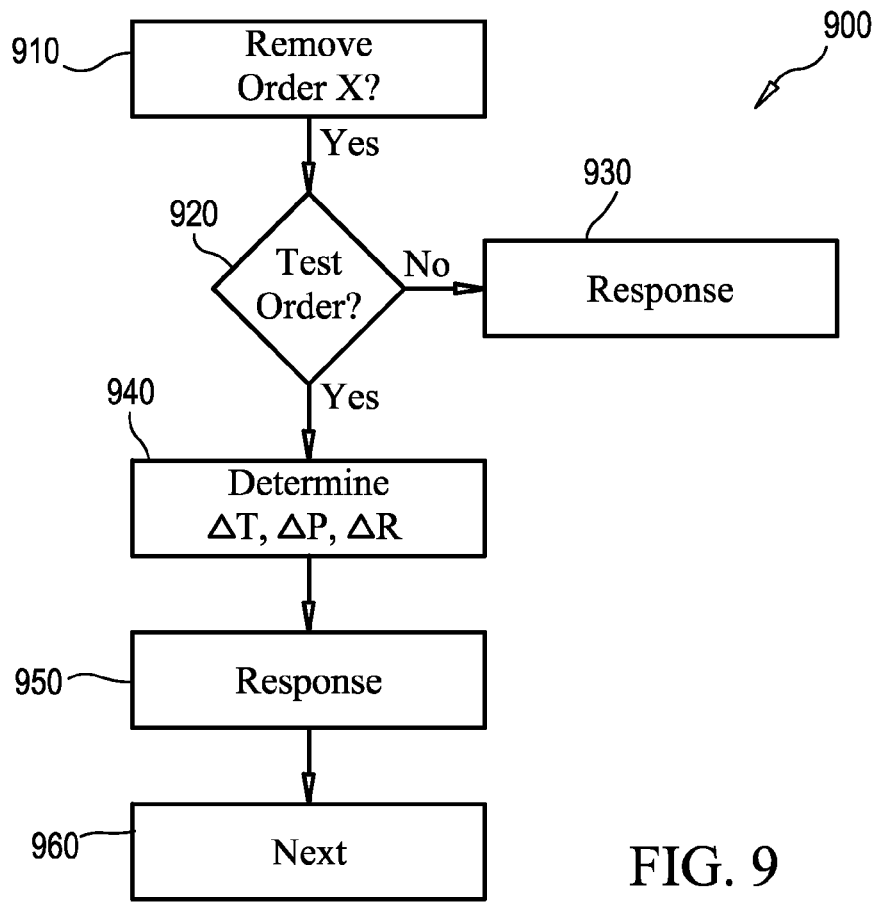
Figure 10:
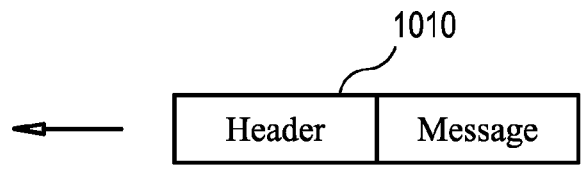

FIGS. 8A-C are flow charts showing alternative order book processing of orders for an instrument, including processing matching orders that are both tests orders;

FIG. 9 is a flow chart showing processing for removal from the order book of unexecuted orders; and FIG. 10 is a data signal specification specifying to a trading and processing computer system that an order in a data signal is a test order or a real order, and for specifying to an originator of a test order that a response is for a response for a test order or a real order.

DETAILED DESCRIPTION OF THE EMBODIMENTS

Various embodiments provide traders a means to test trading strategies on a securities exchange in which actual securities are traded, and without actually trading securities when testing trading strategies. To facilitate this in certain embodiments, this application discloses, among other things, systems and methods for placing test orders and real orders, processing the test orders and the real orders, and transmitting results of processing the tests orders and real orders back to the entities originating the orders.

A test order means a new kind of order that does not bind the party placing the test order to fulfill a contract to tender the money or securities specified in the test order. A test order may be used to test the state and response of a trading computer system. For all embodiments that involve test orders, there are corresponding embodiments achieved by using other types of orders in placed of a test order, such as any of various specific types of test orders, and other orders such as an order that may be converted from a test order or converted to a test order.

In an embodiment, a trading and processing computer system processes a test order similarly to a real order by matching the test order with another order and then generally executing the test order, but it does not generate a transaction involving the test order. In one embodiment, the trading and processing computer system does not execute a real order matching the test order. In another embodiment, the test order and all other orders are placed in a parallel universe, a test order book. The trading and processing computer system sends a test signal specifying processing of the test order back to the entity originating the test order. That test signal may include information normally contained in a signal sent as a result of submission of a real order, as well as additional information. The normal information may include time, price, and quantity of execution. The additional information may include price difference, time difference, and risk differential between a real order and the test order if the test order failed to execute.

In one aspect, an embodiment provides a computerized method and system for trading instruments and processing test orders comprising structure for: receiving, in a trading and processing computer system, real orders and test orders for an instrument; matching a test order with a real order in said trading and processing computer system; responsive to said matching said test order with said real order, (1) automatically executing said test order so that said trading and processing computer system reduces a value for a quantity of said instrument associated with said test order and (2) not executing said real order so that a value for a quantity of said instrument associated with said real order remains unchanged.

In another aspect, an embodiment provides a computerized method and system for trading instruments and processing test orders comprising structure for: receiving, in a trading and processing computer system, real orders and test orders for an instrument; entering said real orders for said instrument in an electronic real order book, wherein read and write access to said electronic real order book is controlled by said trading and processing computer system, and wherein said electronic real order book contains a bid table containing only real bid orders and an offer table containing only real offer orders; copying said electronic real order book to generate an electronic test order book containing a bid table containing said real bid orders and an offer table containing said real offer orders; and entering into said electronic test order book a test order.

Another embodiment provides a method and computer network for processing a test order comprising structure for: generating a test order for an instrument in a trader's computer system; transmitting said test order from said trader's computer system to a trading and processing computer system; ranking said test order in said trading and processing computer system; entering said test order in an order book for said instrument in said trading and processing computer system; generating a response for said test order indicating at least whether said test order executed; and transmitting said response for said test order from said trading and processing computer system to said trader's computer system.

Other embodiments provide novel data signals, including: a data signal transmitting to a trading and processing computer system indicating that an order is a test order, thereby instructing the trading and processing computer system to process said test order differently from a real order such that no transaction with said test order occurs; a data signal transmitting to a trading and processing computer system comprising a flag value, a data format, or account information, and an order, wherein said flag value, said data format, or said account information indicates that an order is a test order, thereby instructing the trading and processing computer system to process said test order differently from a real order such that no transaction with said test order occurs; a data signal indicating whether a test order was matched, transmitted from a trading and processing computer system to an originator of said test order; a data signal indicating whether a test order was executed, transmitted from a trading and processing computer system to an originator of said test order; and a data signal indicating that a test order was not matched, transmitted from a trading and processing computer system to an originator or said test order, said data signal also indicating either (1) at least one of price, time of execution, or creditworthiness of a closest order in price, time of execution, or creditworthiness or (2) difference between at least one of price, time of execution, or creditworthiness of said closest order to said test order.

Another embodiment provides a computer system on which is installed a computerized trading program, said computerized trading program designed to place orders with a trading and processing computer system, including test orders and real orders, and capable of being switch from placing test orders to partially or entirely placing real orders.

In various aspects, the order specifies at least one price (including one or more ranges or sets of prices), at least one quantity (including one or more ranges or sets of quantities), and an instrument (including one or more instruments). The order may also specify type, such as real or test, or a connection identification or previously transmitted information may specify whether an order is real or test. The order may also specify parameters, such as limit or market.

Figure 1:
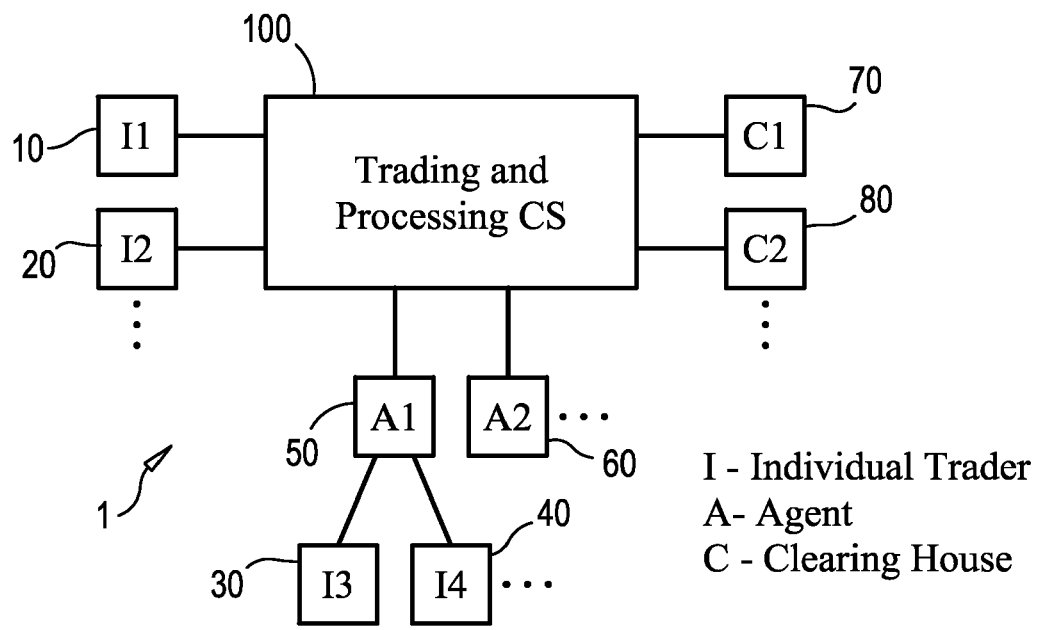
FIG. 1 is a schematic of an electronic exchange network including a trading and processing computer system and various trader, investment company (agent), and clearinghouse computer systems communicating therewith.

FIG. 1 shows electronic exchange network 1 including trading and processing computer system 100, individual trader I1's computer system 10, individual trader 12's computer system 20, individual trader 13's computer system 30, individual trader 14's computer system 40, agent A1's computer system 50, agent A2's computer system 60, clearinghouse C1's computer system 70, and clearinghouse C2's computer system 80. Lines connecting the aforementioned computer systems represent data paths enabling data flow between the computer systems so connected, either wired, wireless, or via intermediate network nodes. FIG. 1 shows individual trader's computer systems 10, 20 connecting to computer system 100, thereby enabling computer systems 10 and 100, and 20 and 100 to communicate there between, and enabling traders I1, I2 to place orders directly with computer system 100. FIG. 1 shows individual traders I3, I4 having computer systems 30, 40 separated from computer system 10 via agent computer systems 50, 60. The agent computer systems 50, 60, represent brokerage company computer systems, one for each brokerage company, with which brokerage companies individuals I3, I4, have accounts. FIG. 1 shows computer system 100 having data communication with clearinghouses' computer systems 70, 80. Optionally, some of all of the aforementioned computer systems may have addresses on a network such as the Internet, and be capable of transmitting to and from one another using the network medium. Three ellipses " . . . " indicate continuation of a series representing an indefinite number of individuals, brokerage computer systems, and clearinghouse computer systems. It should be noted that "individual trader" and similar reference to real people may also refer to a representative of an artificial legal entity, such as a corporation or institution, and that an order may be placed either by persons manually entering data into computers input devices and instructing them to transmit orders or by trading programs running on computers and performing part or all of the order generation and transmission process.

The functional roll of the computer system 30, 40 is to place orders on the accounts of individuals I3, I4, with the computer systems 50, 60 of their respective brokerage agents, and to receive responses from their agents' computer systems indicating action on those orders. The functional role of computer systems 10, 20, 50, and 60, is to place orders on their accounts (and in the case of computer systems 50, 60, on behalf of clients of the agents) with trading and processing computer system 100. The functional role of clearinghouse computer systems 70, 80 is to accept transaction data from trading and processing computer system 100 and effect settlement of those transactions. The functional role of trading and processing computer system 100 is to accept or reject orders, manage the order book, by entering, removing, matching, executing, and transacting orders, and generating and transmitting responses to the order originators and the clearinghouses.

Figure 2:
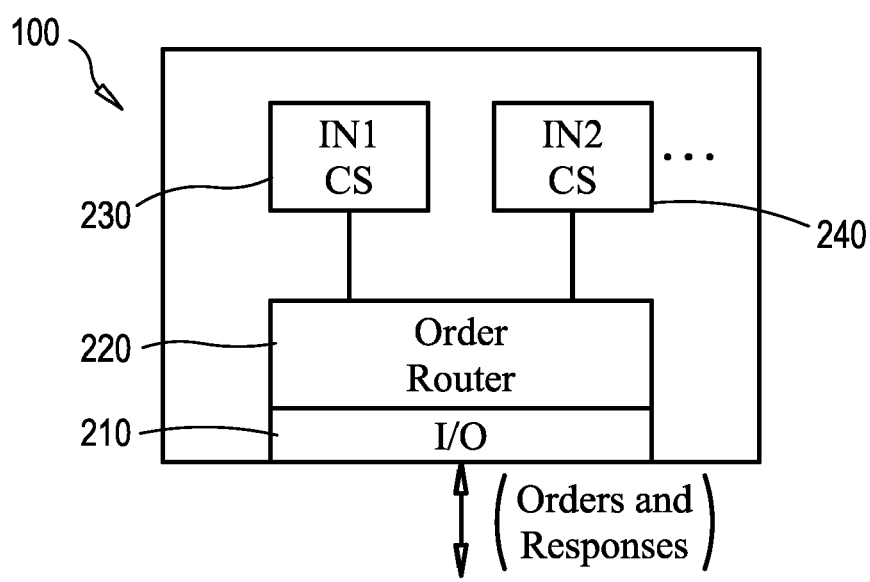
FIG. 2 is a schematic of a trading and processing computer system.

FIG. 2 shows trading and processing computer system 100 including an input/output (I/O) 210, an order/response router, and a series of internal computer systems 230, 240, . . . I/O 210 is structure and optionally also code for receiving orders from computer systems 10-60, and transmitting responses to computer system 10-60. Order router 220 is structure and optionally also code for routing orders for an instrument to the corresponding computer system 230, 240 . . . designed to process the order book for that instrument. Computer systems 230, 240, . . . are functionally identical processing systems each processing the order books for different instruments. Computer system 230 processes order book for instrument IN1. Computer system 240 processes order book for instrument IN2. Optionally, certain order book processing computer systems may process order books for more than one instrument.

In operation, I/O 210 receives orders for computer systems 10-60. Order router 220 routes order for a particular instrument to the corresponding one of the order book processing computer systems 230, 240, . . . depending upon the instrument specified in the order. Each order book processing computer system, like computer system 230, manages adding and removing orders to the order book, matching orders, executing orders, and transacting orders, and preferably logging data, and generating responses.

Alternatively, each one of computer systems 230, 240 may have their own network address and receive orders transmitted to that address. In this alternative, computer systems originating orders (computer systems 10-60) specify the appropriate address of computer systems 230, 240, . . . for instruments specified in the orders.

In any case, computer system 100 preferably transmits transaction information to clearinghouse computer systems 70, 80, for the clearinghouses to perform clearing (settlement) of transactions.

Figures 3, 4, 5:
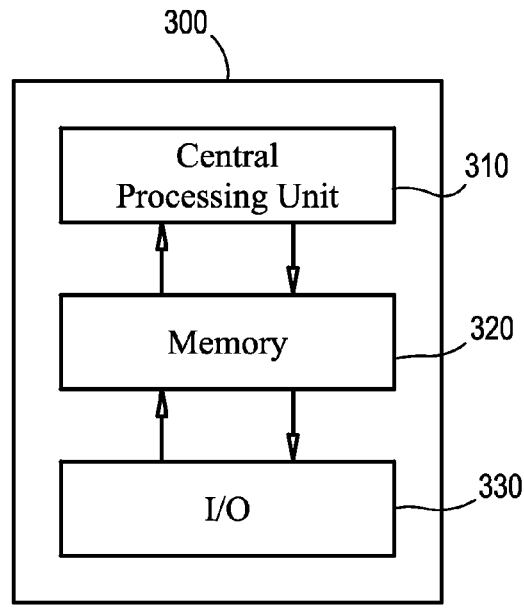
FIG. 3 is a schematic of a computer.
FIG. 4 is a design view schematic of a first data structure for an order book for one instrument in a trading and processing computer system.
FIG. 5 is a schematic of a second data structure for order books for one instrument in a trading and processing computer system, showing two order books, one for processing a test order.

FIG. 3 schematically illustrates core elements of computer 300, including central processing unit 310 for processing instructions, memory 320 for storing instructions and data, and I/O 330 for computer 300 communicating with other devices and people. Each computer may include additional components of various types, including additional processors, various types of memory, such as RAM and disk memory, peripheral controllers, monitors, keyboards, pointing devices, etc. Each computer employs an operating system and typically is used to run certain applications code. Each computer system disclosed herein includes at least one computer, and may include a plurality of computers communicating with one another and operating in a cooperative fashion.

FIG. 4 shows an implementation of an order book (electronic order book) for an instrument implemented in any one of computer systems 230, 240; order book 400. Order book 400 includes bid table 410 and offer table 420. Fields in each table include rank, price, quantity, User ID (UID), and type. Type herein means at least real or test. Rank is preferably included in each table to avoid having to perform ranking calculations prior to each time the corresponding computer system checks its order book 400 for a match. Parameters indicates the possible existence of additional fields, such as duration of order or alternatively good till cancel instruction, whether the order is a "market" order, and limitations on execution of the order. Parameters may include a field indicating whether an order has previously been matched. UID may be, or may include, a specification of a network address to send responses for that order. Alternatively, computer system 230 may store in a lookup table network addresses to which to send responses associated with orders from each UID.

Market orders preferably have their price determined upon entry into the order book based upon entries existing in the order book. Thus, actual market orders transmitted from an order placer may not have a specified price, or may have a dummy price, such as zero or a negative number.

Limitations on execution of test orders may include identity of any matching order. For example, a test order may include a field specifying that it not be executed only if matched to another test order, and/or only under certain additional conditions. For example, the certain additional conditions may be if the matching order has the same UID, a UID in a range or class, not having the same UID, or a UID not in a range or class, or a certain order identifications.

Another limitation on execution of an order is a flag value that indicates whether an order has previously been matched. For example, in one embodiment, a test order may not execute against a real order having a flag value indicating the real order has already been matched. Specifically, consider the situation where the quantity of a test order exceeds the quantity of the real order. The test order is executed in an amount of the quantity of the real order, thereby reducing but not eliminating the quantity of the test order. Since the real order remains in the order book not executed, the test order would again execute against the same real order, unless a mechanism exists to prevent that second execution on the same order. One such prevention mechanism is a parameter value associated with real orders indicating whether a real order was previously matched to a test order. Computer system 230 may be programmed to check the value of that parameter for a real order and not execute a test order matched to that real order. Alternatively, one or more parameter fields for the test order may store one or more identifications of the real orders against which the test order has already executed, and computer system 230 may be programmed to check values of those parameter fields and not execute the test order if the currently matching real order has one of those real order identification values. In both of the foregoing alternatives in this paragraph, computer system 230 may be programmed to compare the test order with successively lower ranked potential matching orders until executions of the test order result in the test order's quantity reaching zero, and the test order being removed from the order book.

In practice, computer system 230 ranks the bids and orders at least by price, such that computer system 230 can identify and retrieve for comparison, to see if a match exists, one or more orders having the lowest offering price and one or more bids having the highest bid price. Bids are only matched to offers, and offers are only matched to bids.

FIG. 5 shows an implementation of an order book; order book 500. Order book 500 includes bid table 410 and offer table 420, and also temp bid table 510 and temp offer table 520. The temp tables 510, 520, may be generated by computer system 230 in response to a certain condition occurring. For example, that condition may be when computer system 230 detects a match involving any test order, or a test order meeting certain conditions, or when a test order is received by computer system 230, or when or when a test order is ranked by computer system 230. Computer system 230 generates temp tables 510, 520 by copying bid table 410 and offer table 420. From that point in time, forward, computer system 230 may process tables 410, 420 as one order book and process in parallel tables 510, 520 as one order book. Specifically, computer system 230 may enter each subsequent in time new bid into both bid tables 410, 510, and enter each subsequent in time new offer into both offer tables 420, 520. Thereafter differences in subsequent matching, executing, and transacting between tables 410, 420, compared to tables 510, 520, represent a perturbation caused by the existence and transaction in the temp order book of said certain test order.

More specifically, computer system 230 may be programmed to treat the certain test order in the order book defined by tables 510, 520 by executing both the test order and its matching order, either regardless of whether the matching order is a real or a test order, or alternatively only if the matching order is real. However, computer system 230 is programmed to not generate any transactions based upon executions of orders in tables 510, 520, and computer system 230 is programmed to not generate responses for transmission to any entity other than the originator of the test order, in response to executions in tables 510, 520. Computer system 230 may determine differences between tables 410 and 510, and between tables 420 and 520, at one or more points in time after execution of the certain test order, and report those difference in a response to the originator of the certain test order. Alternatively, computer system 230 may report certain log data for matchings, executions, and transactions of both sets of tables for some period of time to the originator of the certain test order. Computer system 230 may thereafter erase tables 510, 520, from memory.

computer system 230 may generate a pair of tables like table 510, 520 for each test order, such as each time computer system 230 detects a match involving any test order, or when a test order meeting certain conditions. The certain conditions may be data in the test order specifying this type of parallel processing. The certain conditions may be a system condition, such as a system load processing load, or memory usage below threshold values, thereby enabling this type of memory and processor intensive processing without substantial detrimental impact on transaction processing.

In addition, computer system 230 may be programmed to match and execute in tables 510, 520, any test order and a real order, two matched test orders, or two matched test orders only under certain conditions, or only one of two test orders in a matched pair of test orders, depending on certain conditions, as discussed herein below with reference to FIGS. 8A-C.

Figure 6:
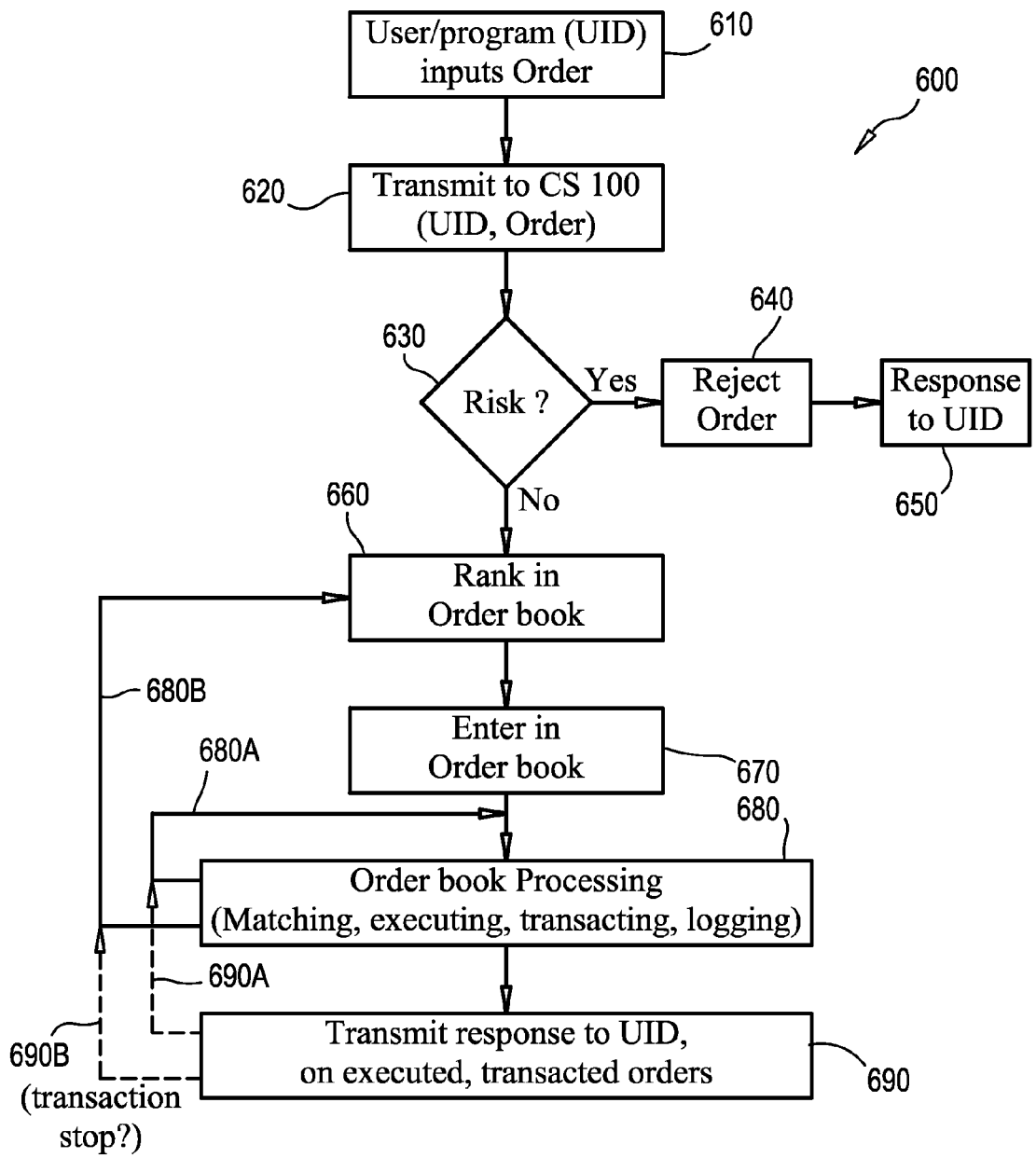
FIG. 6 is a flow chart showing processing of orders for an instrument.

FIG. 6 shows processing 600 of orders from order generation through transmission of response to an executed order.

In step 610, a person or a computerized trading program enters or programmatically generates an order for an instrument in a computer system, such as any one of computer systems 10-60.

In step 610, a person or a computerized trading program instructs the corresponding computer system to transmit that order to trading and processing computer system 100. In step 620, the corresponding computer system transmits the order. Alternatively, the corresponding computer system first runs a risk algorithm to determine whether placing the order would exceed a risk threshold or credit limit associated with an identification of a user, account, or entity associated with the order. Alternatively, computer systems 10-60 only transmits the order to trading and processing computer system 100 even if the risk threshold is exceeded. That is, in one embodiment it may transmit the order if the order is a test order even if the risk threshold is exceeded.

A transmitted order is thereafter received by trading and processing computer system 100. Trading and processing computer system 100 maintains various log records, such as records of transaction, purchases, and sales, and associated identifications of users, accounts, and entity. This log information may be used by computer system 100 amongst other things to perform a risk determination.

In step 630, trading and processing computer system 100 preferably runs a risk algorithm on the order and generates a risk value and determines if that value exceeds risk threshold. If the risk threshold is exceeded, computer system 100 implements step 640 of rejecting the order by not entering it into the order book for the corresponding instrument. In step 650, computer system 100 sends a response to the originator of the order indicating that the order was rejected. If the risk value does not exceed a risk threshold, processing proceeds in one of computer systems 230, 240, etc, (hereinafter computer system 230) for entry into the order book for the corresponding instrument.

In one alternative, test orders that, if real, would exceed a risk threshold, are not rejected. In this alternative, computer system 230 either bypasses risk analysis step 630, or continues after step 630, or step 640 to step 660 with the test order. This allows traders to implement test orders that otherwise would exceed their credit limit.

In another alternative, a person or a computerized trading program specifies to computer system 230 or computer system 100 a test credit limit, which is a credit limit other than a real credit limit. The purpose of setting a test credit limit may be to determine overall return on investment performance when taking into account the cost of credit, such as cost of a performance bond.

In another alternative, agent A1, A2, have their computer systems 50, 60 assess credit of orders placed by individuals I3, I4, and individuals I3, I4, may impose a test credit limit on the risk algorithms implemented by computer systems 50, 60. Then, computer systems 50, 60 act on test orders placed by people or trading programs running on computer systems 50, 60, using the test credit limit to determine whether to accept or reject those test orders.

Steps similar to 630-650 may also be implemented by agent computer systems A1, A2, for orders requested by individuals I3, I4, etc.

Risk data may be associated with the order when it is subsequently entered in the order book, or parameters indicating entities not accepting or accepting that level of risk from that originator may be associated with the order when it is subsequently entered in the order book. In exchanges that do not implement clearinghouses, the risk data may be passed to the originator of a matching order so that that originator can determine whether to accept the risk of non settlement, and therefore determine whether to accept the order.

In step 660, computer system 230 ranks the order.

In step 670, computer system 230 enters the order in the order book.

In step 680, computer system 230 processes the order book by matching, executing, transacting and preferably logging, as described elsewhere in this application. Preferably, if the order book is updated as a result of computer system 230 identifying a match, processing proceeds along path 680A by repeating step 680 of determining if another match exists. If computer system 230 identifies no match, preferably processing proceeds along 680B to 660 by entering another ranked order into the order book. Alternatively, processing from 680 may proceed to step 690 instead of 680A or 680B.

In step 690, computer system 230 generates and transmits responses to the address associated with the UID associated with the order. The responses typically indicate whether the order was executed and transacted, and may also indicate other information as discussed elsewhere herein. Processing may proceed from 690 along paths 690A or 690B back to steps 680 or 660.

If processing does not proceed from 680 to 690, the step 680 preferably includes logging of execution and transaction data such that a separate processing unit can perform step 690. Not shown herein is the generation and transmission of transaction data to clearinghouse computer systems. However, this may occur concurrently with transmission of responses to order originators on transacted orders, periodically, or aperiodically, and be based upon logs of transactions generated by computer system 230 resulting from processing of orders in the order book.

Figure 7:
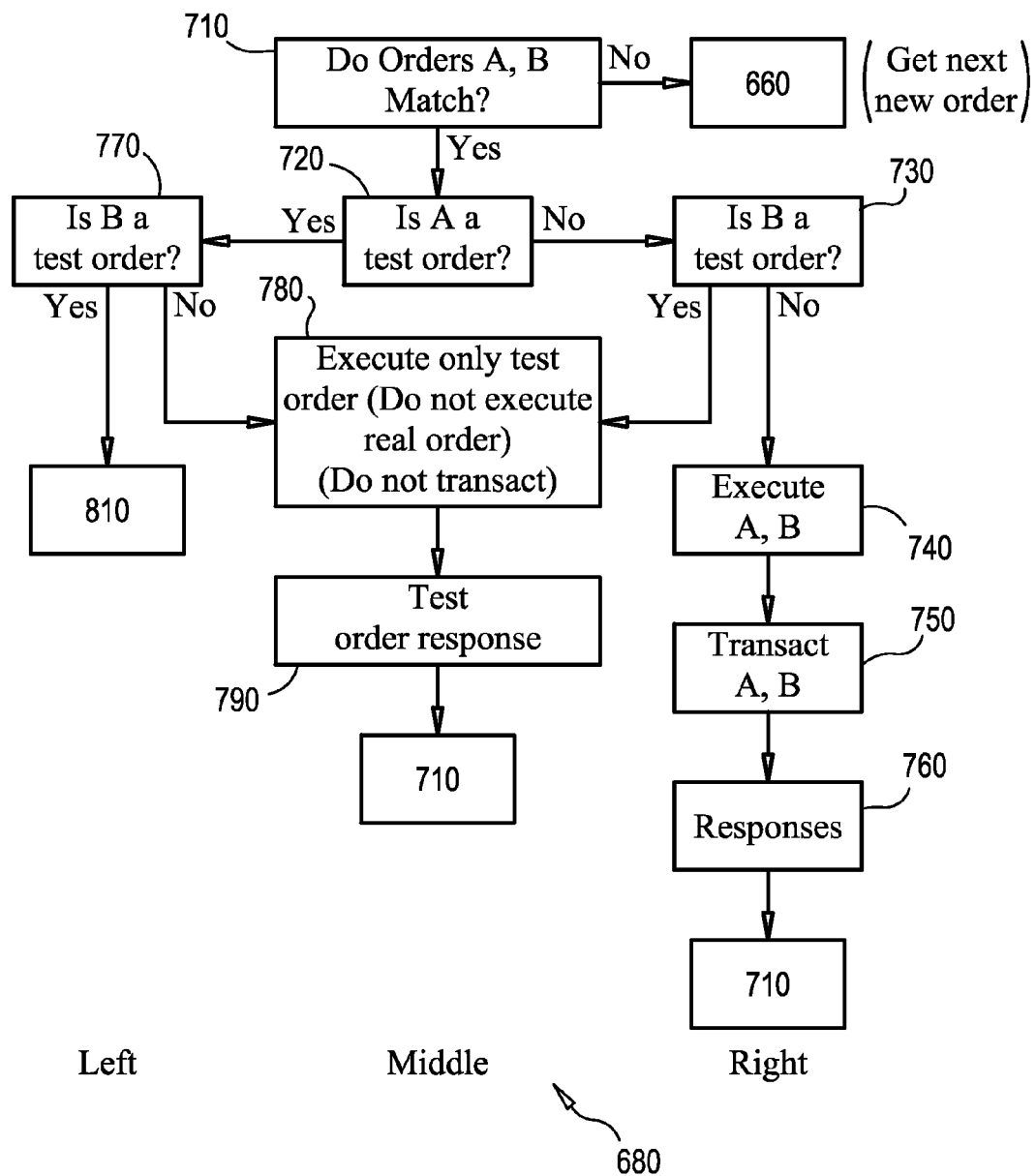
FIG. 7 is a flow chart showing one embodiment of order book processing of orders for an instrument, including processing of tests orders.

FIG. 7 shows processing 680 of an order book, including steps 660 and 710-810. These steps include determinations whether orders match, whether matching orders are test or real orders, and under what conditions to execute and transact matching orders.

In step 710, computer system 230 determines whether orders A and B match. Orders A and B are the highest ranked bid and offer orders in the order book. A is an order having the highest bid price and B is an offer having the lowest offer price. If no match exists, processing returns to step 660 to rank and enter into the order book the next new order. If a match exists, processing proceeds to step 720.

This paragraph discusses the steps along the right column of steps in FIG. 7, for matching real orders. In step 720, computer system 230 determines whether A is a test order. If not, computer system 230 executes step 730. In step 730, computer system 230 determines whether B is a test order. If no, then computer system 230 executes step 740. In step 740 computer system 230 has determined that both A and B are real orders. Computer system 230 thereafter executes and transacts those orders, sends responses to the UIDs associated with each order, and sends transaction information to the clearinghouse handling clearing for the corresponding instrument, and then checks for another match or new orders (steps 740-760 followed by step 710).

This paragraph discusses the steps along the left column of steps in FIG. 7, for matching test orders. In step 720, computer system 230 determines whether A is a test order. If yes, computer system 230 executes step 770. In step 770, computer system 230 determines whether B is a test order. If yes, computer system 230 has determined that the matching orders are both test orders, and proceeds to step 810 shown in FIGS. 8A-C.

This paragraph discusses the steps along the middle column of steps in FIG. 7. This processing occurs when computer system 230 has determined that one of the matched orders is a test order and the other of the matched orders is a real order. In step 780, computer system 230 executes the test order, and does not execute the real order, and performs no transaction, and proceeds to step 790. In step 790, computer system 230 generates and sends a test order response to the address associated with the UID of the originator of the test order. After executing step 790, computer system 230 returns to step 710 to determine if another match exists in the order book. It should be noted that computer system 230/100 performs a transaction by sending responses to the originators (UIDs) of the orders transacted noting the transaction in addition to updating the order book, and in exchanges employing clearinghouses, sends responses containing the details of the transaction to a clearinghouse handling clearing transactions for that instrument.

FIGS. 8A-C show alternatives for processing matching test orders including respectively executing both, executing none, and conditionally executing one or both test orders. In FIGS. 8A-C, in step 810, computer system 230 has determined that both A and B are test orders.

In FIG. 8A, in step 820, computer system 230 executes both A and B. In step 830, computer system 230 generates and transmits responses resulting from the executions.

In FIG. 8B, computer system 230 returns processing to either 710 or 660 (checking for another order match or entering another order into the order book) in response to determining that both orders are test orders.

In FIG. 8C, in step 840, computer system 230 reviews execution criteria associated with order A and determines whether order A meets the execution criteria. If no, it returns processing to either 710 or 660. If yes, computer system 230 executes order A. Similar steps may be implemented by computer system 230 on order B. The execution criteria may be specified in the order, and may include criteria based upon the originator (person, entity, or account code) of the order. For example, the order may include code specifying UIDs of the matching B order for which order A will be executed, or may include code specifying UIDs of the matching B order for which order A will not be executed. The execution criteria may also be based upon any other value of any field associated with the order, or with the matching order, such as price, quantity, market, limit, etc.

FIG. 9 shows a process 900 for removing unexecuted orders from an order book. Unexecuted orders may be removed based upon a cancel order to cancel an order in the order book. Cancel orders are typically transmitted by the originator of the order in the order book. Orders may also be removed from the order book as a result of expiration times specified in the order. Although not shown, computer system 230 preferably executes an order removal step either periodically or before or after steps 710, 660. In multi processor environments implementing the order book in data structures implementing record level locking, a separate process may implement removal of orders concurrent with the order book processing shown in FIGS. 7 and 8.

In step 910, computer system 230 checks for an instruction to remove order X. If yes, computer system 230 determines if order X is a test order.

In step 920, if X is not a test order, computer system 230 generates and transmits a conventional order cancellation response to the originator of order X.

In step 930, if X is a test order, computer system 230 preferably determines one or more of delta T, delta P, and delta R. Delta T, delta P, and delta R respectively are the closest in time real order in the order book that could have matched the test order, over some defined time interval prior to when the test order was in the order book, the closest in price order to the test order during the presence of the test order in the order book, and the difference in risk of any order having the same price as the test order during the presence of the test order in the order book and that executed in lieu of the test order. Computer system 230 preferably preforms these determinations by analyzing data in logs it generated for changes to the order book. In step 950, computer system 230 generates and transmits to the originator of the test order a response notifying the originator of cancellation of the order, and preferably also including any delta T, delta P, and delta R data.

FIG. 10 shows a message format 1000 for transmitting messages containing orders, similar to the format specified in the New York Stock Exchange Common access point specification, revision 1.3. It differs from that specification by allocating to a reserved portion of the message stream, data indicating whether an order contained in the data stream is real or test. FIG. 10 includes message format 1010 including header portion and message portion. The header portion includes length, flags, and application data. Length is a 16 bit binary specifying total message length, and having left to right ordering. Flags is a 16 bit binary in which the value zero indicates a real order, and the value 1 indicates a test order. Application data is variable length constrained to have an even number of bytes. The message portion of the data stream, not specified here, contains in conventional format data specifying the order parameters, but may be modified to enable test orders to specify additional criteria, such as execution criteria when matching a test order. Obviously, this specification is only one of many obvious embodiments of how to incorporate data into an order to specify that it is a test order or a real order.

In one preferred embodiment, a computerized trading program for placing orders and receiving responses from trading and processing computer system 100, may be manually or programmatically switched from test mode in which it places test orders, to real mode in which it places real orders. It may be programmatically switched to real mode in response to any market event. It may be programmatically switched to real mode in response to exceeding one or more trading criteria, such as a fractional or absolute increase in test portfolio value, a rate of increase with time in test portfolio value, a ratio of executed to total test orders, a ratio of test orders not exceeding a risk limit to total test orders, etc. In one alternative, the computerized trading program, when switched from test mode to live mode, may also generate real orders identical to some or all of the pending test orders. In addition, the computerized trading program for placing orders and receiving responses from trading and processing computer system 100, may be only partially manually or programmatically switched from test mode in which it places test orders, to real mode in which it places real orders. Partially switching to real orders may be a switch for only one or more specified instruments. Partially switching may be limited to placing real orders not exceeding a dollar or value limit, such as a value defined by a risk threshold. Partially switching may define a fraction of a test order quantity, and that fraction may be truncated to so that the real order quantity is the next lowest integer amount of one, tens, or hundreds, or rounded up to the next closest one, tens or hundreds. Partially switching may also define placing a defined number of orders as real orders, such as the next 1, 5 or 10 orders. Partially switching may also define placing only during a period of time real orders, such as all placing real orders during a 10, 60, or 3600 hour time period, and then not placing real orders in a subsequent time period. Partially switching may also define alternating between test and real orders, either by sequence, such as every other order, every third, or every tenth order be a real order and the remaining be test orders, or every order during alternate set intervals of time be real orders, such as all orders during alternate seconds, tens or hundreds of seconds be real orders, and the remaining be test orders. Partially switching may also include a ramping up feature, in which the quantity or fraction of real orders compared to test orders per time interval increases with time, either by increasing a quantity associated with real orders or increasing fractions of time during which orders placed are real instead of test. Partially switching may also define placing orders that do not exceed a risk limit as real orders, and placing all remaining orders as test orders.

Additional aspects of a novel trading system are disclosed below.

Additional Information that Cs 230 May Provide

A response provided by computer system 230 to the originator of either a test order, a real order, or an order only for information, may include data indicating the number of orders, duration of each order, or quantity of instruments in orders, of higher rank and lower rank than the originator's order, at any time, when the order is cancelled, and when the order is executed. The response provided by computer system 230 to the originator of a real or test order may include data indicating the number of transactions, prices of transactions, during the time the originator's order was pending, periodically, and in response to matching, execution, or transaction of the originator's order.

If data exists in the orders, response to an originator's order (test order, a real order, or an order only for information) may also specify which of the orders in the order book originated from programmed trading systems and which from people manually entering orders into computer systems and then instructing the computer systems to transmit them to computer system 100. The responses noted in this paragraph do not require the existence of a real or test order. That is, an originator may place an information order via one of computer systems 10-60 with trading and processing computer system 100 to provide this information, without placing a bid or offer order.

Another data provided in a response from computer system 100 may include one or more message rates, such as the rate of all incoming orders, or all bids or all offers, to computer system 100, to computer system 230, the rate of all executions or transactions in computer system 230, the rate of executions or transactions in computer system 230 for a specific instrument, or in computer system 100 for all or a specific instrument. Rate may be determined from system data specifying instantaneous rate, or based upon log data averaged over a period of time, such as 10, 50, 100, milliseconds, a second, a minute or an hour.

A response provided by computer system 230 to the originator of either a test order or a real order may include positional information relative to the originator's order. This information includes how many orders are in the same bid or offer queue or table; how many of higher rank and how many of lower rank; quantity of shares in the offers in the queue of higher and lower rank than the originator's offer, age of each such order relative to the age of the originator's order, and all of that information at one or more times during the presence of the originator's order in the order book. The positional information may include timing information. Specifically, the duration of time prior to which an order was placed that it would have had to have been placed in order to execute, and the during of time prior to which an order was attempted to be canceled that it would have had to have been canceled in order to not have executed.

For orders that are updated, that is changed after entry in the order book, both the original order time, and the update time may be included in responses, if that data is available to computer system 230.

Any message transmitted from computer system 100 to an order originator may also specify the amount of credit that the originator (or the originator's account) has with computer system 100, and value at risk.

Preferably, computer system 100 includes, in a response to an order that did not execute or trade, information relating to why the order did not execute or trade. This information includes the highest ranking of the order while the order was pending, the minimum price difference between the order and any potentially matching orders during the pendency of the order, and the amount of time prior to when the order was actually placed, that it would have had to have been placed, in order to execute, or to have a price that could match some other order's price. Preferably, computer system 100 also includes, in a response to an order that executed, the time at which a request to cancel the order would have had to have been placed in order to have prevented the order from executing. For orders for which a request to cancel was placed, preferably computer system 100 provides in a response the difference in time between when the request to cancel was placed and would have need to be placed to avoid execution of the order. Computer system 100 can derive this information by appropriate queries directed to the data in the order book or to log data storing information about orders removed from the order book, including time of matching, execution, and/or removal from the order book, and quantity and price. Computer system 100 may also incorporate estimates of time from when an order is placed by a trader to when the order is received by computer system 100, computer system 230, and entered into an order book. This data may vary from trader to trader, depending upon network configuration. Network packets may store time of order origination, and this data, compared to time of receipt provided by a clock in computer system 100, 230, may be used to generated transmission time estimates, or may be used as an actual transmission time for a particular order.

The test orders disclosed herein may be used in a computerized trading program, typically implementing application programming interfaces (APIs) for trading and processing computer system 100 in order to place orders and receive responses from computer system 100.

Trading and processing computer system 100 may allocate resources and charge for use of test trades in a variety of ways. It may prioritize use amongst various users, prioritize based upon system resources, implement pay per execution, pay per period of use, or make the test order services free. It may also accept bids for exclusivity of use of test orders for specified instruments or for period of time.

Uses of Test Orders with Various Types of Real Orders

Max Display Orders—A max display order is an order that specifies a quantity to be shown to the market participants, but that also specifies an additional quantity stored in computer system 100 and not shown by computer system 100 to market participants. The additional quantity remains "hidden" in the order book, but it may be matched against other real orders or other max display orders.

A test order could be used to "probe" the marketplace to determine if there was additional quantity associated with a matching order, that is if the matching order were a max display order.

Double secret video—Refers to procedure that allows a market participant having the bid at the best price to offer to the best offerer a trade at an improved bid price, a price closer to the best offerer's price. The offer at the improved price is referred to as a double secret video offer. The best offerer can accept or decline the double secret video offer. If the offerer accepts, then the bidder and offerer trade at the agreed upon improved price. The existence of the improved bid, and/or a trade resulted from acceptance of the improved bid by the best offerer, may not be made available to other bidders and offerers (other market participants) by trading and processing computer system 100.

The existence of a double secret video offer may be embedded in an order. Computer system 100 may respond to a real order that includes a double secret video offer to which a test order is the best offerer by transmitting to the originator of the test offer the double secret video offer. Alternatively to the existence of the double secret video offer being embedded in an offer, computer system 100 may accept from a trader whose bid is at the best price a double secret video offer, and present that offer to the best offerer, even if the best offerer's offer is a test offer order. This alternative requires the bidder with the bid at the best price to know his bid is at the best price; computer system 100 may send the bidder such a notification. In either alternative, a test offer may provides the test offerer knowledge of the double secret video offer.

Additionally, a test order may include a double secret video offer. The double secret video offer in the test order may be a real offer or a test offer. Alternatively, the originator of a test offer that is at the best price may be granted by computer system 100 the right to originate a double secret video offer, real or test.

Cloaked Orders—Some orders may include data specifying to computer system 100 that they not be made publicly available to market participants, even though they reside in the order book. These orders are called cloaked orders. Test orders may be used to identify the existence of cloaked orders. For example, by noting prices at which the test orders execute, the orders against which test orders execute, and optionally other data provided by trading and processing computer system 100 such as order book log data.

Repeated test orders may be used to identify patterns to the placing of cloaked orders, max display orders, and double secret video orders.

Locking preferences and locked markets—Users may set a preference in their order called a locking preference. The locking preference provides for an order to not match, execute, or trade with a corresponding order having the same price (one being a bid and the other being an offer). Instead, an offer having a locking preference set will only trade with a corresponding bid order at a price a predetermined amount higher than the offer price. Likewise, a bid order that has a locking preference set will only trade with an offer having a price at a predetermined amount below the price of the bid order. The predetermined amount may correspond to a commission charged by the exchange to implement a trade, in which case setting the locking preference indicates that the trader is not willing to pay the exchange's commission. A locked market is one in which the spread is zero, and the best bid is at the same price as the best offer. This occurs if one or both of the best orders has a locking preference set. A crossed market is one in which the best offer has a price below the best bid, which occurs when an order having a locking preference set is about to trades with another order. Locked and crossed markets may exist in exchanges that implement locking preferences.

A first user may wish to lock such a market by having their order's locking preference set and then wait for a second user that is willing to pay the market price plus the additional predetermined amount, such as a commission cost, above the locked market's price (crossed market). A user less sensitive to commission costs may wish to trade in a locked; not have their locking preference set. In addition, computer system 100 may respond to orders in a locked market that are within the predetermined amount of the market price, either by querying parameters set in the order, or by querying the originator of the order, whether to unlock their order in response to a locked market (and thereby pay the commission charge). Locking preferences of orders may not, and typically are not, provided by exchanges to the market participants.

Test order may be used to probe the locking preferences of the orders at the best bid and offer prices. That is, a test order that would match another order, but for a locking preference set in the other order, will not execute. Hence, indicating that the other order has a locking preference set. Test orders at a some higher price will execute, that is, when the spread between the test order price and other order's price exceeds the predetermined amount defined by a locking preference of the other order. Thus, test orders may be used to determine the existence of, and the currency amount of another order's locking preference.

In addition, if computer system 100 is so programmed, matching of a test order that is locked to a locked order may provide to the originator of the test order information whether the locked order will unlock upon matching in price to another locked order.

Evaluating Trading Strategies and Alternative Implementations

Test orders disclosed herein may be used effectively in a variety of ways to test the response of a market in order to evaluate the effectiveness in trading strategies in generating profit.

One use is to evaluate a modification of an existing trading strategy. Suppose a trader has automated trading strategy A and has incorporated changes, generating strategy B. The trader may desire to continue to run strategy A if it is profitable. The trader would also like to evaluate the profitability of strategy B to determine if it would be profitable to switch from A to B. In this situation, the trader would want strategy B to submit test orders that would match against all real order except those orders from the traders strategy A. There are many permutations of this type of trading testing and execution selectivity, a couple of which are described below.

Suppose a trader runs trading strategies A and B. The trader would like to evaluate adding strategy C, which means concurrently running all three strategies to place orders and generate trades. In this case the test orders submitted by C should match against any real order. However, in this case, if orders generated by strategy C trade with A or B, it might be the case that the trader wishes executions (though not settlement) to be sent to in response to trades between C and A, and C and B, as the trader wants trading strategies A and B to function as if trades generated by orders originating from trading strategy C were real, so that the trader can evaluate the impact of implementing strategy C with real orders on orders generated by strategies A and B. In this case, there is a meaningful reason for real order to get an execution from a match with a test order. Thus, in this alternative specified real orders (orders generated by strategies A, B) will execute when matched to specified test orders (orders generated by strategy C).

Alternatively, a trader implementing strategies A and B might wish to test modifications of both strategies, C and D. That is, for example when contemplate replacing A and B with C and D. In this case, test orders from C and D should match with each other, since if implemented running real orders, C and D would in fact match with each other. However, test orders from C and D should not match or execute with any other test orders. Also, test orders from C and D should not match and should not execute with real orders from A and B, since, if C and D were implemented with real orders and replaced A and B, orders from A and B would not exist.

Straight Through Processing Testing Concept

In an alternative concept, the exchange may be configured to use certain alternative test orders, referred to herein as straight through processing test orders, to test reliability of all components of an exchange trading system, from order entry to clearing. The goal of such testing using straight through processing test orders is to ensure that the exchange in its entirety functions reliably to implement trading. For example, when hardware or software of any portion of network 1 changes, there is the possibility that such changes may result in data errors and incorrect programming resulting in inaccurate information being stored regarding trading. This possibility may be minimized by testing trading using straight through processing test orders upon any change of any network component to identify problems before they result in erroneous trade data. In this alternative, software in the computer systems 10-80 include code or structure for recognizing orders that are straight through processing test orders and processing the straight through processing test orders exactly the same as any real orders, with the exception of actual settlement (exchange of legal title). In this concept, computer system 100 receives straight through processing test orders and generates responses indicating whether the straight through processing test orders executed, transacted, cleared, and would have settled correctly. Network 1 passes information with or as part of orders indicating orders that are straight through processing test orders from the order originators through the computer system 100 and through the clearinghouse computer systems 70, 80. Computer systems 70, 80. However, the clearinghouses do not reassign actual legal title to instruments identified in transactions involving straight through processing test orders. In one embodiment, each relevant data structure for orders, starting with the order originator, and including computer system 100 and clearinghouse computer systems 70, 80, includes a field in a data structure for storing orders, indicating whether each order is a straight through processing test order. Each element of network 1 is programmed to process transactions including a straight through processing test orders preferably through clearing.

Preferably, computer system 100 is programmed to only match straight through processing test orders against other straight through processing test orders. Alternatively, computer system 100 may be programmed to execute straight through processing test orders against either or both of straight through processing test orders and real orders. Preferably, clearinghouse computer systems 70, 80 perform processing identical to when they clear real orders, including generation of a response to the order originators, except that the response notes the orders are straight through processing test orders, not real orders, and except that computer systems 70, 80 do not perform processing changing legal title for what would be transactions if involving real orders, when involving straight through processing test orders. Thus, computer systems 70, 80, run code determining whether an order is a straight through processing test order, and differ in processing depending upon that determination.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

The invention claimed is:

1. A method, comprising:
receiving, by a processor of computing device, a first order for an instrument, and a first indicator, from a first computer system, wherein the first indicator indicates that the first order is one of a real order or a test order, wherein the first order is a test order, and wherein the first order specifies a first quantity of the instrument and a first price;
receiving, by the processor, a second order for the instrument from a second computer system, wherein the second order is a real order, and wherein the second order specifies a second quantity of the instrument and a second price;
wherein a test order cannot bind an originator of the test order to tender money or the instrument as specified in the test order;
matching, by the processor, the first order with at least the second order;
determining, by the processor, based at least in part on the first indicator, whether the first order is a test order or a real order, wherein determining whether the first order is a test order or a real order comprises:
determining, by the processor, that the first order is a test order;
determining, by the processor, whether the second order is a test order or a real order, wherein determining whether the second order is a test order or a real order comprises:
determining, by the processor, that the second order is a real order;
based at least in part on matching the first order with the second order, executing, by the processor, the first order, wherein executing the first order comprises:
reducing, by the processor, the first quantity of the instrument associated with the first order;
and
receiving, by the processor, a third order for the instrument from a third computer system, wherein the third order is a real order, and wherein the third order specifies a third quantity of the instrument and a third price, and wherein the third order comprises an offer order,
wherein the third order has a locking preference that provides that the third order will only trade with a corresponding bid order that specifies a price that exceeds the third price by a predetermined amount specified in the locking preference of the third order.

2. The method of claim 1, further comprising:
receiving, by the processor, a fourth order for the instrument from a fourth computer system, wherein the fourth order is a test order, wherein the fourth order specifies a fourth quantity of the instrument and a fourth price, wherein the fourth order comprises a bid order, and wherein the fourth price is greater than or equal to the third price but does not exceed the third price plus the predetermined amount; and
indicating, by the processor, to an originator of the fourth order that the third order has the locking preference by failing to match the fourth order to the third order and by failing to execute the fourth order.

3. The method of claim 2, wherein indicating to the originator of the fourth order that the third order has the locking preference by failing to match the fourth order to the third order and by failing to execute the fourth order further comprises:
transmitting, by the processor, to the fourth computer system, a response to the fourth order, wherein the response to the fourth order comprises:
information indicating that the fourth order did not execute, and
information associated with the third price of the third order.

4. The method of claim 2, further comprising:
receiving, by the processor, a fifth order for the instrument from the fourth computer system, wherein the fifth order is a test order, wherein the fifth order specifies a fifth quantity of the instrument and a fifth price, and wherein the fifth order comprises a bid order, and wherein the fifth price is greater than the fourth price and exceeds the third price plus the predetermined amount;
matching, by the processor, the fifth order with the third order;

determining, by the processor, whether the third order is a test order or a real order, wherein determining whether the third order is a test order or a real order comprises: determining, by the processor, that the third order is a real order;

determining, by the processor, whether the fifth order is a test order or a real order, wherein determining whether the fifth order is a test order or a real order comprises: determining, by the processor, that the fifth order is a test order;

based at least in part on matching the fifth order with the third order, executing, by the processor, the fifth order, wherein executing the fifth order comprises:

reducing, by the processor, the fifth quantity of the instrument associated with the fifth order; and wherein the fifth quantity of the instrument comprises the fourth quantity of the instrument and wherein an originator of the fifth order is the originator of the fourth order.

5. The method of claim 4, further comprising:

indicating, by the processor, to the originator of the fifth order, that the fifth price of the fifth order exceeds the third price of the third order by at least the predetermined amount, by transmitting, by the processor, to the fourth computer system, a response to the fifth order, wherein the response to the fifth order comprises:

information indicating that the fifth order executed, and information associated with the third price of the third order.

6. The method of claim 2, wherein the first computer system, the second computer system, the third computer system, and the fourth computer system are all different computer systems.

7. The method of claim 2, wherein the first computer system comprises the second computer system.

8. The method of claim 2, wherein an originator of the first order comprises at least one of a first person, a first entity, and a first account code; and wherein an originator of the second order comprises at least one of a second person, a second entity, and a second account code.

9. The method of claim 8, wherein the originator of the third order comprises at least one of a third person, a third entity, and a third account code; and wherein an originator of the second order comprises at least one of a fourth person, a fourth entity, and a fourth account code.

10. The method of claim 1, wherein the first indicator comprises at least one of a first flag value, a first data format, and first account information.

11. The method of claim 1, wherein the first order comprises the first indicator.

12. The method of claim 1, wherein the first order does not comprise the first indicator.

13. The method of claim 1, wherein a first data signal comprises the first indicator and the first order.

14. The method of claim 1, wherein receiving the second order comprises:

receiving the second order for the instrument, and a second indicator, from the second computer system, wherein the second indicator indicates that the second order is one of a real order or a test order.

15. The method of claim 14, wherein the first indicator comprises at least one of a first flag value, a first data format, and first account information; and wherein the second indicator comprises at least one of a second flag value, a second data format, and second account information.

16. The method of claim 14, wherein determining whether the second order is a test order or a real order comprises:

determining, based at least in part on the second indicator, whether the second order is a test order or a real order.

17. The method of claim 1, wherein the first order comprises a bid order and the second order comprises an offer order.

18. The method of claim 1, wherein the first order comprises an offer order and the second order comprises a bid order.

19. The method of claim 1, wherein even though the first order and the second order are matched, the second order is not executed such that the second quantity of the instrument associated with the second order remains unchanged.

20. The method of claim 19, further comprising:

receiving, by the processor, a fifth order for the instrument from a fifth computer system, wherein the fifth order is a real order, and wherein the fifth order specifies a fifth quantity of the instrument and a fifth price;

matching, by the processor, the fifth order with at least the second order;

based at least in part on matching the fifth order with the second order:

executing, by the processor, the second order, wherein executing the second order comprises:

reducing, by the processor, the second quantity of the instrument associated with the second order;

executing, by the processor, the fifth order, wherein executing the fifth order comprises:

reducing, by the processor, the fifth quantity of the instrument associated with the fifth order; and transacting by the processor, the second order and the fifth order such that an originator of the second order and an originator of the fifth order are bound to tender money or the instrument.

21. The method of claim 1, further comprising:

based at least in part on matching the first order with the second order, executing, by the processor, the second order, wherein executing the second order comprises:

reducing, by the processor, the second quantity of the instrument associated with the second order.

22. The method of claim 1, further comprising:

receiving, by the processor, a fifth order for the instrument from a fifth computer system, wherein the fifth order is a real order, and wherein the fifth order specifies a fifth quantity of the instrument and a fifth price;

matching, by the processor, the fifth order with at least the second order;

based at least in part on matching the fifth order with the second order:

executing, by the processor, the second order, wherein executing the second order comprises:

reducing, by the processor, the second quantity of the instrument associated with the second order;

executing, by the processor, the fifth order, wherein executing the fifth order comprises:

reducing, by the processor, the fifth quantity of the instrument associated with the fifth order; and transacting, by the processor, the second order and the fifth order such that an originator of the second order and an originator of the fifth order are bound to tender money or the instrument.

23. The method of claim 1,
wherein the first quantity of the instrument associated with the first order exceeds the second quantity of the instrument associated with the second order; and
wherein reducing the first quantity of the instrument associated with the first order comprises:
reducing, by the processor, the first quantity of the instrument associated with the first order by the second quantity of the instrument associated with the second order.

24. The method of claim 1, further comprising:
receiving, by the processor, a fifth order for the instrument from a fifth computer system, wherein the fifth order is a real order, and wherein the fifth order specifies a fifth quantity of the instrument and a fifth price;
matching, by the processor, the fifth order with at least the first order,
based at least in part on matching the fifth order with the first order, further executing, by the processor, the first order, wherein further executing the first order comprises:
further reducing, by the processor, the first quantity of the instrument associated with the first order.

25. The method of claim 1, further comprising:
receiving, by the processor, a fifth order for the instrument from a fifth computer system, wherein the fifth order is a test order, and wherein the fifth order specifies a fifth quantity of the instrument and a fifth price;
matching, by the processor, the first order with at least the fifth order;
based at least in part on matching the first order with the fifth order,
further executing, by the processor, the first order, wherein further executing the first order comprises:
further reducing, by the processor, the first quantity of the instrument associated with the first order; and
executing, by the processor, the fifth order, wherein executing the fifth order comprises:
reducing, by the processor, the fifth quantity of the instrument associated with the fifth order.

26. The method of claim 1, further comprising:
receiving, by the processor, a fifth order for the instrument from a fifth computer system, wherein the fifth order is a test order, and wherein the fifth order specifies a fifth quantity of the instrument and a fifth price;
matching, by the processor, the first order with at least the fifth order;
determining, by the processor, whether the fifth order is a test order or a real order, wherein determining whether the fifth order is a test order or a real order comprises:
determining, by the processor, that the fifth order is a test order;
based at least in part on determining that the fifth order is a test order, not executing, by the processor, the first order and not execute, by the processor, the fifth order, thereby not further reducing, by the processor, the first quantity of the instrument associated with the first order, and not reducing, by the processor, the fifth quantity of the instrument associated with the fifth order.

27. The method of claim 1, further comprising:
receiving, by the processor, a fifth order for the instrument from a fifth computer system, wherein the fifth order is a test order, and wherein the fifth order specifies a fifth quantity of the instrument and a fifth price;
matching, by the processor, the first order with at least the fifth order;
based at least in part on matching the first order with the fifth order,
further executing, by the processor, the first order, wherein further executing the first order comprises:
further reducing, by the processor, the first quantity of the instrument associated with the first order; and
not executing, by the processor, the fifth order, thereby not reducing, by the processor, the fifth quantity of the instrument associated with the fifth order.

28. The method of claim 1, further comprising:
generating, by the processor, a response for the first order, wherein the response at least indicates that the first order has been matched; and
transmitting, by the processor, the response to the first computer system.

29. The method of claim 28, wherein even though the first order and the second order are matched, no response related to the matching of the first order with the second order is transmitted to an originator of the second order.

30. The method of claim 1, further comprising:
entering, by the processor, the first order and the second order into an order book for the instrument.

31. The method of claim 30,
wherein the order book comprises a bid table and an offer table;
wherein entering the first order into the order book comprises:
entering, by the processor, the first order into one of the bid table and the offer table; and
wherein each of the bid table and the offer table comprises at least one real order.

32. The method of claim 30, wherein executing the first order further comprises:
updating, by the processor, the order book to indicate that the first quantity of the instrument associated with the first order is reduced.

33. The method of claim 32,
wherein the first quantity of the instrument associated with the first order exceeds the second quantity of the instrument associated with the second order; and
wherein updating the order book comprises:
updating, by the processor, the order book to indicate that the first quantity of the instrument associated with the first order is reduced by the second quantity of the instrument associated with the second order.

34. The method of claim 33, wherein even though the first order and the second order are matched, the second order is not executed such that the second quantity of the instrument associated with the second order remains unchanged within the order book.

35. The method of claim 32, further comprising:
receiving, by the processor, a cancel order to cancel the first order; and
based at least in part on the cancel order, removing, by the processor, the first order from the order book.

36. The method of claim 30,
wherein the second quantity of the instrument associated with the second order at least equals the first quantity of the instrument associated with the first order; and
wherein executing the first order further comprises:
updating, by the processor, the order book to remove the first order from the order book as a result of at least (i) matching the first order with the second order, and (ii) the second quantity of the instrument associated with the second order at least equaling the first quantity of the instrument associated with the first order.

37. The method of claim 36, wherein even though the first order and the second order are matched, the second order is not executed such that the second quantity of the instrument associated with the second order remains unchanged within the order book.

38. The method of claim 30,
wherein the order book comprises a parameter that indicates whether the second order has been matched to a test order; and
wherein the method further comprises:
based at least in part on matching the first order with the second order, updating, by the processor, the order book such that the parameter indicates that the second order has been matched to a test order.

39. The method of claim 30,
wherein the order book comprises at least one parameter to store an identification of a real order against which the first order has been executed; and
wherein executing the first order further comprises:
updating, by the processor, the order book such that the at least one parameter comprises an identification associated with the second order, thereby indicating that the first order has been executed against the second order.

40. The method of claim 30, further comprising:
determining, by the processor, a risk value of the first order; and
determining, by the processor, that the risk value exceeds at least one of a risk threshold and a credit limit; and
wherein entering the first order into the order book comprises:
entering, by the processor, the first order into the order book even though the risk value exceeds at least one of the risk threshold and the credit limit.

41. The method of claim 30,
wherein even though the first order and the second order are matched, the second order is not executed such that the second quantity of the instrument associated with the second order remains unchanged within the order book; and
wherein the method further comprises:
receiving, by the processor, a fifth order for the instrument from a fifth computer system, wherein the fifth order is a real order, and wherein the fifth order specifies a fifth quantity of the instrument and a fifth price;
matching, by the processor, the fifth order with at least the second order,
based at least in part on matching the fifth order with the second order:
executing, by the processor, the second order, wherein executing the second order comprises:
updating, by the processor, the order book to indicate that the second quantity of the instrument associated with the second order is reduced;
executing, by the processor, the fifth order; and
transacting, by the processor, the second order and the fifth order such that an originator of the second order and an originator of the fifth order are bound to tender money or the instrument.

42. An apparatus, comprising:
at least one processor; and
memory electronically coupled to the at least one processor, the memory storing instructions that, when executed by the at least one processor, direct the at least one processor to:
receive a first order for an instrument, and a first indicator, from a first computer system, wherein the first indicator indicates that the first order is one of a real order or a test order, wherein the first order is a test order, and wherein the first order specifies a first quantity of the instrument and a first price;
receive a second order for the instrument from a second computer system, wherein the second order is a real order, and wherein the second order specifies a second quantity of the instrument and a second price;
wherein a test order cannot bind an originator of the test order to tender money or the instrument as specified in the test order;
match the first order with at least the second order;
determine based at least in part on the first indicator, whether the first order is a test order or a real order, wherein determining whether the first order is a test order or a real order comprises:
determining that the first order is a test order;
determine whether the second order is a test order or a real order, wherein determining whether the second order is a test order or a real order comprises:
determining that the second order is a real order;
based at least in part on matching the first order with the second order, execute the first order, wherein executing the first order comprises:
reducing the first quantity of the instrument associated with the first order;
and
receive a third order for the instrument from a third computer system, wherein the third order is a real order, and wherein the third order specifies a third quantity of the instrument and a third price, and wherein the third order comprises an offer order,
wherein the third order has a locking preference that provides that the third order will only trade with a corresponding bid order that specifies a price that exceeds the third price by a predetermined amount specified in the locking preference of the third order.

43. The apparatus of claim 42, wherein the instructions, when executed by the at least one processor, further direct the at least one processor to:
receive a fourth order for the instrument from a fourth computer system, wherein the fourth order is a test order, wherein the fourth order specifies a fourth quantity of the instrument and a fourth price, wherein the fourth order comprises a bid order, and wherein the fourth price is greater than or equal to the third price but does not exceed the third price plus the predetermined amount; and
indicate to an originator of the fourth order that the third order has the locking preference by failing to match the fourth order to the third order and by failing to execute the fourth order.

44. The apparatus of claim 43, wherein indicating to the originator of the fourth order that the third order has the locking preference by failing to match the fourth order to the third order and by failing to execute the fourth order further comprises:
transmitting to the fourth computer system, a response to the fourth order, wherein the response to the fourth order comprises:
information indicating that the fourth order did not execute, and
information associated with the third price of the third order.

45. The apparatus of claim 43, wherein the instructions, when executed by the at least one processor, further direct the at least one processor to:

receive a fifth order for the instrument from the fourth computer system, wherein the fifth order is a test order, wherein the fifth order specifies a fifth quantity of the instrument and a fifth price, and wherein the fifth order comprises a bid order, and wherein the fifth price is greater than the fourth price and exceeds the third price plus the predetermined amount;

match the fifth order with the third order;

determine whether the third order is a test order or a real order, wherein determining whether the third order is a test order or a real order comprises:

determining that the third order is a real order;

determine whether the fifth order is a test order or a real order, wherein determining whether the fifth order is a test order or a real order comprises:

determining that the fifth order is a test order;

based at least in part on matching the fifth order with the third order, execute the fifth order, wherein executing the fifth order comprises:

reducing the fifth quantity of the instrument associated with the fifth order; and wherein the fifth quantity of the instrument comprises the fourth quantity of the instrument and wherein an originator of the fifth order is the originator of the fourth order.

46. The apparatus of claim 45, wherein the instructions, when executed by the at least one processor, further direct the at least one processor to:

indicate to the originator of the fifth order, that the fifth price of the fifth order exceeds the third price of the third order by at least the predetermined amount, by transmitting to the fourth computer system, a response to the fifth order, wherein the response to the fifth order comprises: information indicating that the fifth order executed, and information associated with the third price of the third order.

47. The apparatus of claim 43, wherein the first computer system, the second computer system, the third computer system, and the fourth computer system are all different computer systems.

48. The apparatus of claim 43, wherein the first computer system comprises the second computer system.

49. The apparatus of claim 43, wherein an originator of the first order comprises at least one of a first person, a first entity, and a first account code; and wherein an originator of the second order comprises at least one of a second person, a second entity, and a second account code.

50. The apparatus of claim 49, wherein the originator of the third order comprises at least one of a third person, a third entity, and a third account code; and wherein an originator of the second order comprises at least one of a fourth person, a fourth entity, and a fourth account code.

51. The apparatus of claim 42, wherein the first indicator comprises at least one of a first flag value, a first data format, and first account information.

52. The apparatus of claim 42, wherein the first order comprises the first indicator.

53. The apparatus of claim 52, wherein the first order does not comprise the first indicator.

54. The apparatus of claim 42, wherein a first data signal comprises the first indicator and the first order.

55. The apparatus of claim 42, wherein receiving the second order comprises:

receiving the second order for the instrument, and a second indicator, from the second computer system, wherein the second indicator indicates that the second order is one of a real order or a test order.

56. The apparatus of claim 55, wherein the first indicator comprises at least one of a first flag value, a first data format, and first account information; and wherein the second indicator comprises at least one of a second flag value, a second data format, and second account information.

57. The apparatus of claim 55, wherein determining whether the second order is a test order or a real order comprises:

determining, based at least in part on the second indicator, whether the second order is a test order or a real order.

58. The apparatus of claim 42, wherein the first order comprises a bid order and the second order comprises an offer order.

59. The apparatus of claim 42, wherein the first order comprises an offer order and the second order comprises a bid order.

60. The apparatus of claim 42, wherein even though the first order and the second order are matched, the second order is not executed such that the second quantity of the instrument associated with the second order remains unchanged.

61. The apparatus of claim 60, wherein the instructions, when executed by the at least one processor, further direct the at least one processor to:

receive a fifth order for the instrument from a fifth computer system, wherein the fifth order is a real order, and wherein the fifth order specifies a fifth quantity of the instrument and a fifth price;

match the fifth order with at least the second order;

based at least in part on matching the fifth order with the second order:

execute the second order, wherein executing the second order comprises:

reducing the second quantity of the instrument associated with the second order;

execute the fifth order, wherein executing the fifth order comprises:

reducing the fifth quantity of the instrument associated with the fifth order; and transact the second order and the fifth order such that an originator of the second order and an originator of the fifth order are bound to tender money or the instrument.

62. The apparatus of claim 42, wherein the instructions, when executed by the at least one processor, further direct the at least one processor to:

generate a response for the first order, wherein the response at least indicates that the first order has been matched; and transmit the response to the first computer system.

63. The apparatus of claim 62, wherein even though the first order and the second order are matched, no response related to the matching of the first order with the second order is transmitted to an originator of the second order.

64. The apparatus of claim 42, wherein the instructions, when executed by the at least one processor, further direct the at least one processor to:

enter the first order and the second order into an order book for the instrument.

65. The apparatus of claim 64, wherein the order book comprises a bid table and an offer table;

wherein entering the first order into the order book comprises:
    entering the first order into one of the bid table and the offer table; and
    wherein each of the bid table and the offer table comprises at least one real order.

66. A non-transitory tangible computer readable medium, wherein the computer readable medium comprises instructions that, when executed by at least one processor, direct the at least one processor to:
    receive a first order for an instrument, and a first indicator, from a first computer system, wherein the first indicator indicates that the first order is one of a real order or a test order, wherein the first order is a test order, and wherein the first order specifies a first quantity of the instrument and a first price;
    receive a second order for the instrument from a second computer system, wherein the second order is a real order, and wherein the second order specifies a second quantity of the instrument and a second price;
        wherein a test order cannot bind an originator of the test order to tender money or the instrument as specified in the test order;
    match the first order with at least the second order;
    determine based at least in part on the first indicator, whether the first order is a test order or a real order, wherein determining whether the first order is a test order or a real order comprises:
        determining that the first order is a test order;
    determine whether the second order is a test order or a real order, wherein determining whether the second order is a test order or a real order comprises:
        determining that the second order is a real order;
    based at least in part on matching the first order with the second order, execute the first order, wherein executing the first order comprises:
        reducing the first quantity of the instrument associated with the first order;
    and
    receive a third order for the instrument from a third computer system, wherein the third order is a real order, and wherein the third order specifies a third quantity of the instrument and a third price, and wherein the third order comprises an offer order,
        wherein the third order has a locking preference that provides that the third order will only trade with a corresponding bid order that specifies a price that exceeds the third price by a predetermined amount specified in the locking preference of the third order.

67. The computer readable medium of claim 66, wherein the instructions, when executed by the at least one processor, further direct the at least one processor to:
    receive a fourth order for the instrument from a fourth computer system, wherein the fourth order is a test order, wherein the fourth order specifies a fourth quantity of the instrument and a fourth price, wherein the fourth order comprises a bid order, and wherein the fourth price is greater than or equal to the third price but does not exceed the third price plus the predetermined amount; and
    indicate to an originator of the fourth order that the third order has the locking preference by failing to match the fourth order to the third order and by failing to execute the fourth order.

68. The computer readable medium of claim 67, wherein indicating to the originator of the fourth order that the third order has the locking preference by failing to match the fourth order to the third order and by failing to execute the fourth order further comprises:
    transmitting to the fourth computer system, a response to the fourth order, wherein the response to the fourth order comprises:
        information indicating that the fourth order did not execute, and
        information associated with the third price of the third order.

69. The computer readable medium of claim 67, wherein the instructions, when executed by the at least one processor, further direct the at least one processor to:
    receive a fifth order for the instrument from the fourth computer system, wherein the fifth order is a test order, wherein the fifth order specifies a fifth quantity of the instrument and a fifth price, and wherein the fifth order comprises a bid order, and wherein the fifth price is greater than the fourth price and exceeds the third price plus the predetermined amount;
    match the fifth order with the third order;
    determine whether the third order is a test order or a real order, wherein determining whether the third order is a test order or a real order comprises:
        determining that the third order is a real order;
    determine whether the fifth order is a test order or a real order, wherein determining whether the fifth order is a test order or a real order comprises:
        determining that the fifth order is a test order;
    based at least in part on matching the fifth order with the third order, execute the fifth order, wherein executing the fifth order comprises:
        reducing the fifth quantity of the instrument associated with the fifth order; and
    wherein the fifth quantity of the instrument comprises the fourth quantity of the instrument and wherein an originator of the fifth order is the originator of the fourth order.

70. The computer readable medium of claim 69, wherein the instructions, when executed by the at least one processor, further direct the at least one processor to:
    indicate to the originator of the fifth order, that the fifth price of the fifth order exceeds the third price of the third order by at least the predetermined amount, by transmitting to the fourth computer system, a response to the fifth order, wherein the response to the fifth order comprises: information indicating that the fifth order executed, and information associated with the third price of the third order.

71. The computer readable medium of claim 67, wherein the first computer system, the second computer system, the third computer system, and the fourth computer system are all different computer systems.

72. The computer readable medium of claim 67, wherein the first computer system comprises the second computer system.

73. The computer readable medium of claim 67,
    wherein an originator of the first order comprises at least one of a first person, a first entity, and a first account code; and
    wherein an originator of the second order comprises at least one of a second person, a second entity, and a second account code.

74. The computer readable medium of claim 73,
    wherein the originator of the third order comprises at least one of a third person, a third entity, and a third account code; and wherein an originator of the second order comprises at least one of a fourth person, a fourth entity, and a fourth account code.

75. The computer readable medium of claim 66, wherein the first indicator comprises at least one of a first flag value, a first data format, and first account information.

76. The computer readable medium of claim 66, wherein the first order comprises the first indicator.

77. The computer readable medium of claim 66, wherein the first order does not comprise the first indicator.

78. The computer readable medium of claim 66, wherein a first data signal comprises the first indicator and the first order.

79. The computer readable medium of claim 66, wherein receiving the second order comprises:

receiving the second order for the instrument, and a second indicator, from the second computer system, wherein the second indicator indicates that the second order is one of a real order or a test order.

80. The computer readable medium of claim 79, wherein the first indicator comprises at least one of a first flag value, a first data format, and first account information; and wherein the second indicator comprises at least one of a second flag value, a second data format, and second account information.

81. The computer readable medium of claim 79, wherein determining whether the second order is a test order or a real order comprises:

determining, based at least in part on the second indicator, whether the second order is a test order or a real order.

82. The computer readable medium of claim 66, wherein the first order comprises a bid order and the second order comprises an offer order.

83. The computer readable medium of claim 66, wherein the first order comprises an offer order and the second order comprises a bid order.

84. The computer readable medium of claim 66, wherein even though the first order and the second order are matched, the second order is not executed such that the second quantity of the instrument associated with the second order remains unchanged.

85. The computer readable medium of claim 84, wherein the instructions, when executed by the at least one processor, further direct the at least one processor to:

receive a fifth order for the instrument from a fifth computer system, wherein the fifth order is a real order, and wherein the fifth order specifies a fifth quantity of the instrument and a fifth price;

match the fifth order with at least the second order;

based at least in part on matching the fifth order with the second order:

execute the second order, wherein executing the second order comprises:

reducing the second quantity of the instrument associated with the second order;

execute the fifth order, wherein executing the fifth order comprises:

reducing the fifth quantity of the instrument associated with the fifth order; and transact the second order and the fifth order such that an originator of the second order and an originator of the fifth order are bound to tender money or the instrument.

86. A method, comprising:

receiving, by a processor of computing device, a first order for an instrument, and a first indicator, from a first computer system, wherein the first indicator indicates that the first order is one of a real order or a test order, wherein the first order is a test order, and wherein the first order specifies a first quantity of the instrument and a first price;

receiving, by the processor, a second order for the instrument from a second computer system, wherein the second order is a real order, and wherein the second order specifies a second quantity of the instrument and a second price;

wherein a test order cannot bind an originator of the test order to tender money or the instrument as specified in the test order;

matching, by the processor, the first order with at least the second order;

determining, by the processor, based at least in part on the first indicator, whether the first order is a test order or a real order, wherein determining whether the first order is a test order or a real order comprises:

determining, by the processor, that the first order is a test order;

determining, by the processor, whether the second order is a test order or a real order, wherein determining whether the second order is a test order or a real order comprises:

determining, by the processor, that the second order is a real order;

based at least in part on matching the first order with the second order, executing, by the processor, the first order, wherein executing the first order comprises:

reducing, by the processor, the first quantity of the instrument associated with the first order;

and receiving, by the processor, a third order for the instrument from a third computer system, wherein the third order is a real order, and wherein the third order specifies a third quantity of the instrument and a third price, and wherein the third order comprises a bid order, wherein the third order has a locking preference that provides that the third order will only trade with a corresponding offer order that specifies a price that is below the third price by a predetermined amount specified in the locking preference of the third order.

87. The method of claim 86, further comprising:

receiving, by the processor, a fourth order for the instrument from a fourth computer system, wherein the fourth order is a test order, wherein the fourth order specifies a fourth quantity of the instrument and a fourth price, wherein the fourth order comprises an offer order, and wherein the fourth price is less than or equal to the third price but is not below the third price minus the predetermined amount; and indicating, by the processor, to an originator of the fourth order that the third order has the locking preference by failing to match the fourth order to the third order and by failing to execute the fourth order.

88. The method of claim 87, wherein indicating to the originator of the fourth order that the third order has the locking preference by failing to match the fourth order to the third order and by failing to execute the fourth order further comprises:

transmitting, by the processor, to the fourth computer system, a response to the fourth order, wherein the response to the fourth order comprises:

information indicating that the fourth order did not execute, and information associated with the third price of the third order.

89. The method of claim 87, further comprising:
receiving, by the processor, a fifth order for the instrument from the fourth computer system, wherein the fifth order is a test order, wherein the fifth order specifies a fifth quantity of the instrument and a fifth price, and wherein the fifth order comprises an offer order, and wherein the fifth price is less than the fourth price and is below the third price minus the predetermined amount;
matching, by the processor, the fifth order with the third order;
determining, by the processor, whether the third order is a test order or a real order, wherein determining whether the third order is a test order or a real order comprises:
determining, by the processor, that the third order is a real order;
determining, by the processor, whether the fifth order is a test order or a real order, wherein determining whether the fifth order is a test order or a real order comprises:
determining, by the processor, that the fifth order is a test order;
based at least in part on matching the fifth order with the third order, executing, by the processor, the fifth order, wherein executing the fifth order comprises:
reducing, by the processor, the fifth quantity of the instrument associated with the fifth order; and
wherein the fifth quantity of the instrument comprises the fourth quantity of the instrument and wherein an originator of the fifth order is the originator of the fourth order.

90. The method of claim 89, further comprising:
indicating, by the processor, to the originator of the fifth order, that the fifth price of the fifth order is less than the third price of the third order by at least the predetermined amount, by transmitting, by the processor, to the fourth computer system, a response to the fifth order, wherein the response to the fifth order comprises:
information indicating that the fifth order executed, and
information associated with the third price of the third order.

91. An apparatus, comprising:
at least one processor; and
memory electronically coupled to the at least one processor, the memory storing instructions that, when executed by the at least one processor, direct the at least one processor to:
receive a first order for an instrument, and a first indicator, from a first computer system, wherein the first indicator indicates that the first order is one of a real order or a test order, wherein the first order is a test order, and wherein the first order specifies a first quantity of the instrument and a first price;
receive a second order for the instrument from a second computer system, wherein the second order is a real order, and wherein the second order specifies a second quantity of the instrument and a second price;
wherein a test order cannot bind an originator of the test order to tender money or the instrument as specified in the test order;
match the first order with at least the second order;
determine based at least in part on the first indicator, whether the first order is a test order or a real order, wherein determining whether the first order is a test order or a real order comprises:
determining that the first order is a test order;
determine whether the second order is a test order or a real order, wherein determining whether the second order is a test order or a real order comprises:
determining that the second order is a real order;
based at least in part on matching the first order with the second order, execute the first order, wherein executing the first order comprises:
reducing the first quantity of the instrument associated with the first order;
and
receive a third order for the instrument from a third computer system, wherein the third order is a real order, and wherein the third order specifies a third quantity of the instrument and a third price, and wherein the third order comprises a bid order,
wherein the third order has a locking preference that provides that the third order will only trade with a corresponding offer order that specifies a price that is below the third price by a predetermined amount specified in the locking preference of the third order.

92. The apparatus of claim 91, wherein the instructions, when executed by the at least one processor, further direct the at least one processor to:
receive a fourth order for the instrument from a fourth computer system, wherein the fourth order is a test order, wherein the fourth order specifies a fourth quantity of the instrument and a fourth price, wherein the fourth order comprises an offer order, and wherein the fourth price is less than or equal to the third price but is not below the third price minus the predetermined amount; and
indicate to an originator of the fourth order that the third order has the locking preference by failing to match the fourth order to the third order and by failing to execute the fourth order.

93. The apparatus of claim 92, wherein indicating to the originator of the fourth order that the third order has the locking preference by failing to match the fourth order to the third order and by failing to execute the fourth order further comprises:
transmitting to the fourth computer system, a response to the fourth order, wherein the response to the fourth order comprises:
information indicating that the fourth order did not execute, and
information associated with the third price of the third order.

94. The apparatus of claim 92, wherein the instructions, when executed by the at least one processor, further direct the at least one processor to:
receive a fifth order for the instrument from the fourth computer system, wherein the fifth order is a test order, wherein the fifth order specifies a fifth quantity of the instrument and a fifth price, and wherein the fifth order comprises an offer order, and wherein the fifth price is less than the fourth price and is below the third price minus the predetermined amount;
match the fifth order with the third order;
determine whether the third order is a test order or a real order, wherein determining whether the third order is a test order or a real order comprises:
determining that the third order is a real order;
determine whether the fifth order is a test order or a real order, wherein determining whether the fifth order is a test order or a real order comprises:
determining that the fifth order is a test order;
based at least in part on matching the fifth order with the third order, execute the fifth order, wherein executing the fifth order comprises:

reducing the fifth quantity of the instrument associated with the fifth order; and wherein the fifth quantity of the instrument comprises the fourth quantity of the instrument and wherein an originator of the fifth order is the originator of the fourth order.

95. The apparatus of claim 94, wherein the instructions, when executed by the at least one processor, further direct the at least one processor to:

indicate to the originator of the fifth order, that the fifth price of the fifth order is less than the third price of the third order by at least the predetermined amount, by transmitting, by the processor, to the fourth computer system, a response to the fifth order, wherein the response to the fifth order comprises:

information indicating that the fifth order executed, and information associated with the third price of the third order.

96. A non-transitory tangible computer readable medium, wherein the computer readable medium comprises instructions that, when executed by at least one processor, direct the at least one processor to:

receive a first order for an instrument, and a first indicator, from a first computer system, wherein the first indicator indicates that the first order is one of a real order or a test order, wherein the first order is a test order, and wherein the first order specifies a first quantity of the instrument and a first price;

receive a second order for the instrument from a second computer system, wherein the second order is a real order, and wherein the second order specifies a second quantity of the instrument and a second price;

wherein a test order cannot bind an originator of the test order to tender money or the instrument as specified in the test order;

match the first order with at least the second order;

determine based at least in part on the first indicator, whether the first order is a test order or a real order, wherein determining whether the first order is a test order or a real order comprises:

determining that the first order is a test order;

determine whether the second order is a test order or a real order, wherein determining whether the second order is a test order or a real order comprises:

determining that the second order is a real order;

based at least in part on matching the first order with the second order, execute the first order, wherein executing the first order comprises:

reducing the first quantity of the instrument associated with the first order;

and receive a third order for the instrument from a third computer system, wherein the third order is a real order, and wherein the third order specifies a third quantity of the instrument and a third price, and wherein the third order comprises a bid order, wherein the third order has a locking preference that provides that the third order will only trade with a corresponding offer order that specifies a price that is below the third price by a predetermined amount specified in the locking preference of the third order.

97. The computer readable medium of claim 96, wherein the instructions, when executed by the at least one processor, further direct the at least one processor to:

receive a fourth order for the instrument from a fourth computer system, wherein the fourth order is a test order, wherein the fourth order specifies a fourth quantity of the instrument and a fourth price, wherein the fourth order comprises an offer order, and wherein the fourth price is less than or equal to the third price but is not below the third price minus the predetermined amount; and indicate to an originator of the fourth order that the third order has the locking preference by failing to match the fourth order to the third order and by failing to execute the fourth order.

98. The computer readable medium of claim 97, wherein indicating to the originator of the fourth order that the third order has the locking preference by failing to match the fourth order to the third order and by failing to execute the fourth order further comprises:

transmitting to the fourth computer system, a response to the fourth order, wherein the response to the fourth order comprises:

information indicating that the fourth order did not execute, and information associated with the third price of the third order.

99. The computer readable medium of claim 97, wherein the instructions, when executed by the at least one processor, further direct the at least one processor to:

receive a fifth order for the instrument from the fourth computer system, wherein the fifth order is a test order, wherein the fifth order specifies a fifth quantity of the instrument and a fifth price, and wherein the fifth order comprises an offer order, and wherein the fifth price is less than the fourth price and is below the third price minus the predetermined amount;

match the fifth order with the third order;

determine whether the third order is a test order or a real order, wherein determining whether the third order is a test order or a real order comprises:

determining that the third order is a real order;

determine whether the fifth order is a test order or a real order, wherein determining whether the fifth order is a test order or a real order comprises:

determining that the fifth order is a test order;

based at least in part on matching the fifth order with the third order, execute the fifth order, wherein executing the fifth order comprises:

reducing the fifth quantity of the instrument associated with the fifth order; and wherein the fifth quantity of the instrument comprises the fourth quantity of the instrument and wherein an originator of the fifth order is the originator of the fourth order.

100. The computer readable medium of claim 99, wherein the instructions, when executed by the at least one processor, further direct the at least one processor to:

indicate to the originator of the fifth order, that the fifth price of the fifth order is less than the third price of the third order by at least the predetermined amount, by transmitting, by the processor, to the fourth computer system, a response to the fifth order, wherein the response to the fifth order comprises:

information indicating that the fifth order executed, and information associated with the third price of the third order.

* * * * *